US012770118B2

(12) United States Patent
Alfert et al.

(10) Patent No.: US 12,770,118 B2
(45) Date of Patent: Oct. 20, 2026

(54) COIN MANAGING UNIT, AND METHOD IN A COIN MANAGING UNIT

(71) Applicant: GIESECKE+DEVRIENT ADVANCE52 GMBH, Munich (DE)

(72) Inventors: Klaus Alfert, St. Augustin (DE); Lars Hupel, Munich (DE); Teresa Riedl, Gmund am Tegernsee (DE)

(73) Assignee: GIESECKE+DEVRIENT ADVANCE52 GMBH, Munich (DE)

( * ) Notice: Subject to any disclaimer, the term of this patent is extended or adjusted under 35 U.S.C. 154(b) by 0 days.

(21) Appl. No.: 18/693,283

(22) PCT Filed: Jul. 18, 2022

(86) PCT No.: PCT/EP2022/025335
§ 371 (c)(1),
(2) Date: Mar. 19, 2024

(87) PCT Pub. No.: WO2023/046317
PCT Pub. Date: Mar. 30, 2023

(65) Prior Publication Data

US 2024/0386401 A1 Nov. 21, 2024

(30) Foreign Application Priority Data

Sep. 24, 2021 (DE) ..................... 10 2021 004 850.4
Oct. 7, 2021 (DE) ..................... 10 2021 005 040.1

(51) Int. Cl.
*G06Q 20/00* (2012.01)
*G06Q 20/06* (2012.01)
(Continued)

(52) U.S. Cl.
CPC ......... *G06Q 20/065* (2013.01); *G06Q 20/108* (2013.01); *G06Q 20/223* (2013.01); *G06Q 20/3829* (2013.01)

(58) Field of Classification Search
None
See application file for complete search history.

(56) References Cited

U.S. PATENT DOCUMENTS 5,751,638 A * 5/1998 Mick .......................... G06F 5/10
365/189.04
11,146,556 B2 * 10/2021 Prahlad ................... H04L 67/10
(Continued)

FOREIGN PATENT DOCUMENTS

DE 102009034436 A1 1/2011
DE 102020004121 A1 1/2022
(Continued)

OTHER PUBLICATIONS

Goh; A divisible extension of the Brands digital cash protocol_ k-term coins; IEEE; pp. III-452-III-457; 2000.*
(Continued)

*Primary Examiner* — Radu Andrei
(74) *Attorney, Agent, or Firm* — Workman Nydegger

(57) ABSTRACT

A coin management unit of a user, includes: an execution unit for managing digital coin datasets of a digital central bank currency system. The execution unit is adapted to exchange digital coin datasets with other coin management units in transactions and to send registration demands to a coin register of the central bank; and at least one digital coin dataset. The coin management unit is adapted to store conditional transactions as data elements, wherein a transaction is executed when a condition of the stored conditional transaction is satisfied. The coin management unit is further adapted to store the conditional transactions with different read and/or write. A corresponding is associated with a digital central bank currency system.

20 Claims, 7 Drawing Sheets

(51) Int. Cl.

| | |
|---|---|
| ***G06Q 20/10*** | (2012.01) |
| ***G06Q 20/22*** | (2012.01) |
| ***G06Q 20/38*** | (2012.01) |

(56) References Cited

U.S. PATENT DOCUMENTS

| | | | | |
|---|---|---|---|---|
| 2004/0098369 | A1* | 5/2004 | Elzur | G06F 12/145 |
| 2007/0050239 | A1* | 3/2007 | Caneva | G06Q 10/06 705/7.41 |
| 2012/0084135 | A1* | 4/2012 | Nissan | G06Q 30/0238 705/14.38 |
| 2017/0372278 | A1 | 12/2017 | Frolov et al. | |
| 2019/0102756 | A1 | 4/2019 | Zhou et al. | |
| 2019/0295159 | A1 | 9/2019 | Samid | |
| 2019/0354967 | A1* | 11/2019 | Lee | G06Q 20/382 |
| 2020/0252471 | A1* | 8/2020 | Chauhan | H04N 21/44226 |
| 2021/0044842 | A1* | 2/2021 | Chauhan | H04L 51/10 |
| 2021/0084670 | A1* | 3/2021 | Chauhan | H04L 65/80 |
| 2021/0248602 | A1 | 8/2021 | Sweet | |
| 2021/0319413 | A1* | 10/2021 | Saeki | G06Q 20/0457 |
| 2022/0207500 | A1 | 6/2022 | Gawlas et al. | |
| 2022/0391290 | A1* | 12/2022 | Geckeler | G06F 11/1461 |
| 2023/0103038 | A1 | 3/2023 | Fritzhanns et al. | |
| 2023/0259899 | A1 | 8/2023 | Albert et al. | |

FOREIGN PATENT DOCUMENTS

| | | | |
|---|---|---|---|
| EP | 0772165 | A2 | 5/1997 |
| WO | 2019072278 | A2 | 4/2019 |
| WO | 2020044635 | A1 | 3/2020 |
| WO | 2020212331 | A1 | 10/2020 |
| WO | 2021170646 | A1 | 9/2021 |

OTHER PUBLICATIONS

Goyal; Coin Detection based Mobile Charging System; IEEE; pp. 60-63; 2019.*

Rajasekaran; Smart digital hundi for identification of Indian coin and currency; ICECA 2018; pp. 1181-1184; 2018.*

Vijayaraj; Mobile Charging System Based on Coin Detection; ICCCI, 5 pages; 2023.*

German Search Report from corresponding DE Application No. 102021005040.1, Feb. 7, 2022.

International Search Report from corresponding PCT Application No. PCT/EP2022/025335, Oct. 27, 2022.

Anonymous: “Access control—Wikipedia”, Nov. 8, 2016 (Nov. 8, 2016), https://web.archive.org/web/20161108030226/https://en.wikipedia.org/wiki/Access_control, retrieved May 9, 2017, 10 pages.

* cited by examiner

| 91 | | | 92 | | | | 93 | | |
|---|---|---|---|---|---|---|---|---|---|
| 911 | 912 | 913 | 921 | 922 | 923 | 96 | 931 | 932 | 933 |
| ID1 | ID2 | 100 | Date | 1 | A | I | T-1 | C1 | A789 |
| ID1 | ID3 | 50 | Event | 1 | B | II | T-2 | C2 | ... |
| ID4 | ID1 | 50 | Time | - | C | III | R-1 | - | ... |
| ID1 | ID4 | 10 | Threshold | - | A | III | R-2 | - | ... |
| ID1 | G1 | 20 | Request | 3 | B | II | R-3 | - | ... |
| G2 | ID1 | 40 | Event | Mon | D | IV | R-4 | ... | GL |
| ... | | | | | | | | | |

COIN MANAGING UNIT, AND METHOD IN A COIN MANAGING UNIT

BACKGROUND

The invention relates to a coin management unit and a method for managing coin datasets in a coin management unit.

Various possible technical solutions are already known for a digital currency issued by a central bank (a CBDC).

In one approach, coin datasets are secured by a central bank entity only using cryptography and the coin datasets secured by cryptography are exchanged directly between coin management units of the users in encrypted form. The coin management units can check the authenticity of the coin datasets with the aid of the cryptographic security means such as a signature and should check in advance a certificate of the central bank and/or the other coin management unit as to its validity within the certificate hierarchy.

In a second approach, the digital currency or the coin datasets is or are stored in a centralized or decentralized blockchain of a central bank. When a coin dataset changes owner in a blockchain as part of a transaction, a lot of information (sender/recipient/amount) is, however, often published and the sender and the recipient generally need to access the blockchain at the time of the transaction. Because the blockchain or its server can access the electronic coin datasets, the server can automatically execute a transaction, for example at a predetermined time.

In a third approach, the coin datasets are stored and directly exchanged by the user, for example in a local coin management unit. A coin register stores a registration for all the valid coin datasets such that the user can check the validity of the coin datasets with the aid of the coin register. Because the coin register only comprises registration datasets, it has no access to the coin datasets themselves.

WO 2020/212331 A1 uses and expands on this third approach by means of which the coin datasets can be exchanged directly between the users. In WO 2020/212331 A1, a directly exchanged coin dataset can also be passed to a further recipient without there being any need to connect to the coin register. The recipient or the further recipient can later generate a new coin dataset with the same amount and send a demand to the coin register that the registration of the old coin dataset in the coin register is replaced by a registration of the new coin dataset with the same amount.

WO 2020/212331 A1 moreover describes that a local coin management unit of the user can store coin datasets in a vault module of the user in addition to the usual management of the coin datasets including the direct exchange of the coin datasets and the sending of registration demands.

SUMMARY

The object of the present invention is to provide a method, a coin management unit, or a system, in which a payment transaction is configured securely but nevertheless simply.

A coin management unit of a user comprises an execution unit for managing digital coin datasets of a digital central bank currency system, wherein the execution unit is adapted to exchange digital coin datasets with other coin management units in transactions and to send registration demands to a coin register of the central bank; and at least one digital coin dataset.

The coin management unit is now adapted to store conditional transactions as data elements, wherein a transaction is executed only when a condition of the stored conditional transaction is satisfied.

The coin management unit is moreover adapted to store the conditional transactions with different read and/or write rights.

The combination of stored conditional transactions and different read and/or write rights produces a very flexible versatile solution.

In the coin management unit, at least one first conditional transaction preferably has first read and/or write rights and at least one second conditional transaction has second different read and/or write rights. Both read and/or write rights can differ in the read rights, the write rights, or the read and write rights. The coin management unit can additionally comprise further conditional transactions with first, second, or third read and/or write rights.

In preferred configurations, the read and/or write rights differ in the write rights for the user and/or in the read and/or write rights for third parties, in particular for the other coin management units.

The condition contained in the stored conditional transaction can comprise: a time condition, in particular a point in time or a time period. The point in time at which the transaction is to be executed can be indicated, for example, as a time of day, a day of the week, and/or a date. The time period can be indicated, for example, in hours, days, weeks, months, and/or years, for example every 2 hours or daily or monthly. The transaction for the stored conditional transaction is then (repeatedly) executed periodically. It is in each case executed again after the time period has expired.

The condition can alternatively be a comparative condition, in particular comprise a comparative value which is compared for a comparison with an internal parameter of the coin management unit such as the total amount of the coin datasets in the coin management unit or transaction counters or the transaction total within a time period, etc, or with an external parameter such as a stock price, a data element in a server or a database, etc. The external parameter can be called, for example, by the coin management unit for the comparison or be automatically obtained from an external source.

The condition can furthermore alternatively be a receipt condition. The transaction can in particular be executed as soon as a security value such as a signature, or a code value such as a password, of the conditional transaction has been received. Likewise, receipt of a receive transaction can serve as a condition, or receipt of a request for the conditional transaction can serve as a condition.

Because the transaction is executed only when the condition contained in the stored conditional transaction has been satisfied, the transaction can also be referred to as the transaction to be executed. As part of the transaction, a coin dataset is exchanged with another coin management unit (sent to it or received from it) such that the transaction could also possibly be referred to as an exchange transaction.

The condition can optionally contain an execution limit, for example comprising a number of executions (once, n times, or an unlimited number of times) and/or a time indication (executable up to a certain point in time).

The coin management unit, preferably its execution unit or a condition checking unit, checks whether the condition of the conditional transaction has been satisfied. The check can here be made in particular continuously, periodically, for example every hour or every day (but adapted to the conditions to be checked), and/or in response to a receipt procedure in the coin management unit.

Different types of conditional transactions can be stored in the coin management unit. In particular, at least two or three different types of conditional transactions are stored. Possible types, present individually or in combination with one another, are: guaranteed conditional transaction, callable conditional transaction, periodic conditional transaction, and/or conditional return service transaction. Preferably stored in the coin management unit are:

at least two conditional transactions of a first type which have the same or different read and/or write rights, and/or at least two conditional transactions of the at least two different types which have the same or different read and/or write rights.

The conditional transaction can already comprise, in addition to the basic data of the transaction to be executed (recipient, sender, and amount), one or more further data elements of the transaction, in particular the coin dataset to be exchanged and/or the transaction number. The conditional transaction can already comprise all the data elements of the transaction to be executed. Such a configuration is possible in particular for send transactions to be executed which are readable only by the user and not by third parties (or receive transactions which are readable only by the sender and not by the user). The conditional transaction preferably does not comprise one or more of the data elements of the transaction to be executed only when the condition is satisfied, in particular one or more of the following data elements:

an identifier of the sender of the at least one coin dataset, for example when the sender is arbitrary or can belong to a group, an identifier of the recipient of the at least one coin dataset, for example when the sender is arbitrary or can belong to a group, a transaction number, in particular when the transaction can be executed multiple times, the at least one coin dataset of the transaction to be executed, only for example in the case it can be executed multiple times or where a transaction partner has previously not been provided.

The coin management unit can be a coin management unit with an independent execution unit and optionally comprise multiple coin deposits of the user. The coin management unit can be configured, for example, as a security module, a smart card, part of a cellphone, an RFID, USB, or Bluetooth token, etc. The coin management unit can be present in a coin deposit management unit which comprises multiple coin deposits, preferably of different users, and a common execution unit for the multiple coin deposits, wherein the coin management unit is formed by one of the coin deposits together with the common execution unit. The coin deposit management unit is generally a server which provides the coin deposits to the different users.

Each coin management unit should comprise an identifier (ID) of the coin management unit and can optionally comprise a key, for example for authenticating the coin management unit, and/or a certificate associated with the identifier and/or the (public) key (of the key pair).

The coin management unit comprises at least one storage area for conditional transactions of the coin management unit or of a coin deposit, and additionally a common storage area for multiple coin deposits—of the coin management unit or a coin deposit management unit with the coin management unit—in which one or more of the following pieces of information are stored:

references to one or more coin deposits with conditional transactions, in particular coin deposits to be checked at certain times, more preferably with their checking interval; and/or the conditions to be checked of conditional transactions of multiple coin deposits; and/or the conditional transactions of the coin management unit which are readable for each third party.

This configuration is useful in particular when the conditions need to be checked for many coin deposits or for coin deposits which are stored with encryption.

In particularly preferred variants, conditional transactions, on the basis of the read and/or write rights:

are readable by at least one other coin management unit of another user of the digital central bank currency system but are writable only by the user or only jointly by the user and the at least one other coin management unit of the other user of the digital central bank currency system; and/or are readable and writable only by the user; and/or are readable by at least one other coin management unit of another user of the digital central bank currency system but are writable only by an issuer unit.

The coin management unit can comprise specifications which are checked for transactions to be executed and/or for conditional transactions to be stored. It can thus in particular be configured to check one or more of the following specifications before the execution of transactions:

a recipient specification which restricts the coin management unit to precisely one recipient, precisely one recipient group, or to multiple recipients and/or recipient groups, and/or a sender specification which restricts the coin management unit to precisely one sender, precisely one sender group or multiple senders and/or sender groups, and/or a functional specification which relates to a function which can be executed by the execution unit and which restricts in particular the executable function for the coin management unit, preferably for a coin deposit of the coin management unit, completely, partially, or not at all; and/or a send or receive specification which restricts the sending of coin datasets, or respectively the receipt of coin datasets for the coin management unit, preferably for a coin deposit of the coin management unit; and/or an amount specification with a maximum value for the amount of the coin dataset to be sent and/or for the amount of the coin dataset to be received and/or a maximum value or a minimum value for the total amount of the stored coin datasets;

a specification which can be selected by the user, which is to be selected in particular by the user such that it is narrower than a specification fixed by the issuer of the coin management unit; and/or a return service specification, wherein, in response to at least one received coin dataset as a service, the return service is provided, in particular in the response data to the sender of the received coin dataset.

The coin management unit can alternatively or additionally comprise specifications and be configured to check the specifications before the storage of a conditional transaction, wherein the specification is preferably a specification for conditional transactions. In addition to the already mentioned specifications for amount, recipient, or sender which can be narrower for conditional transactions than for transactions to be executed directly, specifications of the issuer of the coin management unit or the user which restrict, for example, the type of the conditional transaction and/or the type of the condition for the coin management unit, for example, can be considered as specifications for conditional transactions.

Two coin deposits in the coin management unit could—as already partly described—be associated with the same user or be associated with different users in a coin deposit management unit.

The secure execution unit for managing the coin datasets is additionally preferably configured to

- send transaction register data to a transaction register, wherein the transaction register data comprise in particular a unique transaction identifier, a transaction amount, a coin management unit identifier of the sender, a coin management unit identifier of the recipient, and the register reference of the coin dataset in the coin register; and/or
- send registration demands to the coin register which comprise at least one register reference of a coin dataset previously registered in the coin register and a register reference of a coin dataset to be registered in the coin register.

In the digital central bank currency system, digital coin datasets can be divided (into multiple coin datasets: 10=>5, 5), switched (an exchange which is neutral in terms of the amount: new coins for old coins), or combined with another coin dataset (new coin dataset: 2+10=12). Corresponding registration demands then need to be sent to the coin register for the new coin datasets or their references.

It should be noted that the specifications and the conditional transactions are stored as data elements and they are therefore not fixed by the programming of the coin management unit (software).

A conditional transaction with read and/or write rights can be stored for a coin deposit of the coin management unit, in particular in a temporary store of a coin deposit of the coin management unit or in a temporary store of the coin management unit which encompasses all the coin deposits.

In particular a recipient of the transaction or a third party can, for example, trigger the transaction if they know the security value and send it as a trigger (possibly together with the ID of the coin management unit and/or a transaction number). A random value or a cryptographic security value (hash value of data/signature of data/etc) can, for example, serve as a security value.

Functional specifications can be provided for checking the specifications as a positive or negative checking criterion. The function can be used when a positive checking criterion is satisfied, and not used when a negative checking criterion is satisfied. Positive checking criteria are preferably used for partially restrictive functional specifications. A partially restrictive direction specification thus preferably contains the permissible senders and/or recipients (positive checking criterion). Alternatively or additionally, it is conceivable to store impermissible senders and/or recipients in the direction specification (negative checking criterion). A complete restriction such as, for example, in the case of a direction specification "no sending" or "no receiving", can also be stored differently in a functional specification. The complete restriction is preferably stored as content of the functional specification (such as "impermissible" or "no"). Alternatively, the complete restriction could indicate the storing of empty content (" " or " ") or invalid content (such as "-" as a number, ID, etc). It can be provided to store one or more non-restrictive functional specifications. One example would be a coin deposit which can be sent to any recipient but can be received only from certain senders. In preferred configurations, the non-restrictive functional specification is indicated by the lack of this specification, for example: there is a sender specification but no recipient specification for the coin deposit. Alternatively, however, the content of the functional specification can indicate that the functional specification contains no restriction, for example: a recipient specification with the content "each", "all", "*", or the like.

A functional specification for conditional transactions can in turn contain a complete restriction, a partial restriction, or no restriction. Thus, the first functional specification can indicate that conditional transactions are impermissible for the first coin deposit (complete restriction), and the second functional specification indicate that conditional transactions can be either unrestricted or partially restricted for the second coin deposit. Alternatively, the first functional specification could contain for the first coin deposit a partial restriction for conditional transactions, and the second functional specification could contain for the second coin deposit no restriction for conditional transactions. Furthermore, alternatively the two functional specifications could restrict conditional transactions differently for the coin deposits.

There can be different types of conditional transactions which differ in their complexity and/or in their encoding (conditional transaction encoded according to standard A or type B or proprietary C, etc). The different types of conditional transactions are supported by the secure execution unit, in the present case permissible for coin deposits by corresponding specifications but only selectively or restrictively.

In preferred configurations, a send specification (or recipient specification) of a coin deposit, i.e. in particular also of the first and/or second coin deposit, differs from its receipt specification (or sender specification). The direction specifications are thus preferably asymmetrically configured for a coin deposit.

The conditional transaction can have a send or receipt specification as a condition which restricts the sending of coin datasets or the receipt of coin datasets for the coin management unit, preferably for a coin deposit of the coin management unit.

A user specification can be selected by the user. It is preferably to be selected such that it is narrower than the corresponding specification fixed by the issuer. The user thus has the possibility of further restricting a specification of the issuer. The specifications can be referred to as issuer specifications and user specifications. Naturally, system-wide valid specifications are (hard-programmed in the secure execution unit and) no longer fixable by the issuer or selectable by the user. The issuer can correspondingly also fix its specifications only as narrower than the system specifications. In this respect, the secure execution unit contains system specifications and additionally checks the (functional and other) specifications of the coin deposit.

Preferably used as coin management unit identifiers are

- a uniform resource identifier (URI), in particular according to RFC 3986,
- a uniform resource name (URN), in particular according to RFC 8141, and/or
- a universally unique identifier (UUID), in particular according to RFC 4122. The URI can contain a UUID and/or a URN.

The URI comprises as its parts, for example, a schema, such as a URN or UUID, a supplier, such as an operator name or domain name of the operator, and the unique part, such as a UUID or serial number. For example: urn: uuid: 965ecc78-3182-4d5b-8f6a-1e325b336031.

The URN comprises as its parts, for example, a resource type (for example, a coin management unit), an operator name, generally the domain name of the operator (for example, my-bank.com), and a part which is unique at least for the operator but preferably system-wide (for example, a serial number or UUID). A sender and a recipient of a transaction could then, for example, be indicated as follows: sender-ID: "coin-management-unit: my-bank.com: dlafujr3jbd" or recipient-ID: "coin-management-unit: your-bank.com: 3hbbda903988r".

In a UUID "xxxxxxxx-xxxx-Mxxx-Nxxx-SVxxxxxxxxxx", according to RFC 4122 the version of the UUID is encoded in the half-byte M and the variant of the UUID in the half-byte N. Now a functional specification can be indicated in at least one further part of the UUID, such as for example the half-bytes S and/or V (in version 4, variant 1). It is thus, for example, possible to encode in the half-byte S that the coin deposit is present in a coin deposit management unit. In one part of the UUID, such as this or a further half-byte, at least short functional specifications can be encoded. For example, "no restriction of direction", "no sending", or "no receiving" could be encoded in 3 bits. Likewise, a specification for conditional transactions could be encoded in the 3 bits or a further 3 bits, for example the permissibility of three types of conditions or three types of conditional transactions could be encoded.

The coin management unit identifier can comprise at least a (short) functional specification or part of the functional specifications. A certificate can contain more data than an identifier. Correspondingly, the coin management unit certificate can contain one or more functional specifications.

A certificate can have a coin management unit as a member of a group, for example as a group certificate, such as "ID/key belongs to group XY", or as an attribute certificate, such as "attribute YZ satisfied". A recipient group can be indicated in the specification, for example, also by the group and/or a certificate type, such as "certificate for group XY" or "certificate for attribute YZ". For example, the specification can demand a certificate for the attribute "bookstore" from the publishing group "beautifulbooks". In alternative or supplementary configurations, at least a partially restrictive receipt specification restricts the receipt of coin datasets to precisely one sender, precisely one sender group, or multiple senders and/or sender groups. The sender or senders and/or sender group or groups are contained in the specification, in particular by indicating a sender ID, a sender group ID, or a sender ID part or a certificate group. A sender group can, however, for example also be indicated in the specification by a group and/or a certificate type, such as "certificate for group XY" or "certificate for attribute YZ".

At least one coin dataset is exchanged between two coin management units as part of a transaction. Preferably, a registration request is sent to the coin register and/or a transaction dataset is sent to a transaction register for a coin dataset derived from the exchanged coin dataset. The at least one coin dataset is initially stored with the sender, such as a first or second coin deposit, of the coin dataset. The coin dataset (or a coin dataset derived therefrom) is stored with the recipient after the transaction. The coin dataset is preferably transferred directly between the sender and the recipient, in particular the coin dataset can be passed directly to a further recipient. WO 2020/212331 A1 already describes the corresponding fundamental principle. The present solution is, however, not linked to the masking of the amount of the coin datasets which is described therein or to the specific protocols of WO 2020/212331 A1.

Conditional transactions are preferably executed precisely once. It is, however, possible to provide conditional transactions which are executed multiple times, in particular also with or without a limit to the number of executions (for example, every 2 weeks or precisely four times related to an event). The conditional transaction can be executed, thus for example with the stored amount and recipient, or alternatively a demanded transaction—in particular by a third party/recipient—can be executed which comes under the stored conditional transaction. Thus, for example, a transaction demanded by the recipient with a transaction amount which is smaller than the stored amount and/or with a recipient who belongs to a stored recipient group.

Coin deposits can be associated with a first (the same) user. The first user has, for example, two coin deposits in the coin management unit which comprise different specifications. Alternatively, a first coin deposit can be associated with a first user and a second coin deposit with a second user. The first and/or the second user can have multiple coin deposits in the coin management unit as well as one or more local coin management units, for example in the form of a security module such as a smart card, a SIM card, an RFID token, an NFC module, a built-in security module.

A coin deposit management unit for multiple users is provided by an operator who can be, for example, a financial services provider such as a commercial bank, a credit card provider, or a payment services provider (PayPal, etc). The creation of the coin deposit is generally instructed by a third party, the issuer.

The coin deposit can comprise a partially freely readable specification, in particular also the functional specifications. In particular, there can be a readable part and a non-readable part of the at least partially freely readable specification. The two parts are preferably stored in different data elements, in particular a freely readable data element such as the coin management unit certificate or identifier or a non-confidential specification data element, and in a not freely readable data element of the coin deposit such as a dedicated confidential specification data element. Alternatively, the two parts are stored in a common data element in a not freely readable form and additionally the readable part is stored in a separate readable data element such as the coin management unit certificate or identifier or a non-confidential specification data element.

The secure execution unit can send transaction register data to a transaction register for the management of the coin datasets. The transaction register data comprise in particular a unique transaction identifier, a transaction amount, a coin management unit identifier of the sender, a coin management unit identifier of the recipient, and the (at least one) register reference of the coin dataset in the coin register.

Alternatively or additionally, the secure execution unit can send registration demands to the coin register for the management of the coin datasets, said registration demands comprising in particular at least one register reference of a coin dataset previously registered in the coin register and a register reference of a coin dataset to be registered in the coin register.

A method for managing coin datasets of a digital central bank currency system with a coin register in a coin management unit, which comprises an execution unit and at least one coin dataset of the central bank, comprises the following steps in the coin management unit.

Storing a first conditional transaction which contains a condition for the execution of a transaction, wherein the transaction comprises the exchange of at least one coin dataset between the coin management unit and another coin management unit of the digital central bank currency system. The first conditional transaction is here stored in the coin management unit as a data element and the stored first conditional transaction has read and/or write rights which differ from read and/or write rights or an already stored second conditional transaction.

Checking whether the condition has been satisfied, and executing the transaction only if the condition has been satisfied.

All the above remarks about the device can be applied analogously in this associated method.

Executing the transaction preferably comprises:

- sending the coin dataset to the other coin management unit or receiving the coin dataset from the other coin management unit; and/or
- sending a registration demand to a coin register of the central bank, said registration demand comprising in particular at least one register reference of a coin dataset previously registered in the coin register and a register reference of a coin dataset to be registered in the coin register, and/or
- sending transaction register data to a transaction register, and/or
- providing a return service, in particular after receiving the coin dataset as the condition.

The method can additionally comprise the read and/or write process.

The following steps can preferably be made:

- receiving a read and/or write request from a requester, in particular a user of the coin management unit or another coin management unit, for at least one conditional transaction;
- optionally checking an authentication of the requester;
- checking the read and/or write rights of the at least one conditional transaction,
- answering the read and/or write request depending on the read and/or write rights, in particular in the case of a read request by providing the conditional transaction for the requester or in the case of a write request by writing the conditional transaction.

Executing the transaction can comprise: sending or receiving a coin dataset of the central bank, and/or sending a registration demand to a coin register of the central bank which in particular demands the registration of a coin dataset to be stored in the new coin management unit for a received previously registered coin dataset, and/or sending transaction register data to a transaction register, and/or providing a return service, wherein in particular the transaction demand comprises a coin dataset.

A transaction request comprises in particular a transaction amount, a coin management unit identifier of the sender, and a coin management unit identifier of the recipient. Purely optionally, it moreover comprises a unique transaction identifier and/or a transaction reference text. A transaction request is generally sent by the user of the coin deposit. In configurations, the transaction request can also be sent by another coin management unit or a transaction partner (sender or recipient of coin datasets) to the coin deposit management unit. The step of executing the transaction comprises sending at least one coin dataset of the coin deposit to a recipient (or receiving at least one coin dataset which is contained in particular in the transaction request). In the step of executing the transaction, a coin dataset to be transmitted can be generated and registered in the coin register, in particular if the amount of the coin dataset to be transmitted corresponds to a transaction amount. At least one coin dataset, i.e. possibly two or more coin datasets, of the coin deposit are transmitted in the step of executing the transaction. Coin datasets can be transmitted separately or in transaction messages, for example together with a transaction ID, in particular when an encrypted connection between the sender and the recipient has already been established. Alternatively, however, a complete transaction message can also be transmitted (especially between coin deposit management units). A complete transaction message contains in particular the data elements contained in the transaction request, and the at least one coin dataset.

Transaction requests, coin datasets, and/or complete transaction messages can preferably be contained in an http message. Transaction requests, coin datasets, and/or complete transaction messages can alternatively or additionally be transmitted in a JSON format. The JavaScript Object Notation (JSON) format preferably corresponds to RFC 8259 (and/or ECMA 404 or ISO/IEC 21778). A transaction ID can be formatted as a UUID. A transaction request could then be formatted, for example, as follows:

```
{
"sender": "urn:coin-management-unit:my-bank.com:dlafujr3jbd",
"recipient": "urn: coin-management-unit:your-bank.com:3hbbda903988r",
"amount": "1.60 eCBDC"
"transaction reference text": "transaction number 1234898942"
}
```

An associated transaction message, here with 2 coin datasets, could then be formatted, for example, as follows:

```
{
"transaction ID": "1c102b5f-5496-459d-8a67-3bf1c348b113",
"sender": "urn: coin-management-unit:my-bank.com:dlafujr3jbd",
"recipient": "urn: coin-management-unit:your-bank.com:3hbbda903988r",
"coin datasets": [
    {
  "amount": 1000, "...
  number":"116e782982383e9d0ea2c728f2a5f80d8a6121"
    },
    {
    "amount": 60, "... number":
    "1aaa77777777777733333c9123812123712814"
  }
],
"transaction reference text": "invoice 1234898942"
}
```

The methods described can be performed in one of the abovedescribed coin deposit management units. The different methods and configurations can be combined with one another and can, for example, relate to different coin deposits or in each case to the first and/or second coin deposit.

A digital central bank currency system comprises a coin management unit—in one of the configurations described or configured to perform one of the methods described. The system moreover comprises the coin register of the central bank and optionally multiple coin management units and/or a transaction register.

The present solution is particularly advantageous because the high degree of flexibility in the coin deposit management unit can be supplied independently of the coin register and/or the transaction register. In particular, the coin register, to which a particularly high number of demands are already made in a digital currency system, is not slowed down.

BRIEF DESCRIPTION OF THE DRAWINGS

The invention and further embodiments and advantages of the invention will be explained in detail below on the basis of Figures, wherein the Figures only describe exemplary embodiments of the invention. The same constituent parts are provided with the same reference signs in the Figures. The Figures should not be considered as true to scale and individual elements of the Figures can be illustrated as exaggeratedly large or exaggeratedly simple.

In the drawings.

DETAILED DESCRIPTION OF VARIOUS EMBODIMENTS

Figure 1:
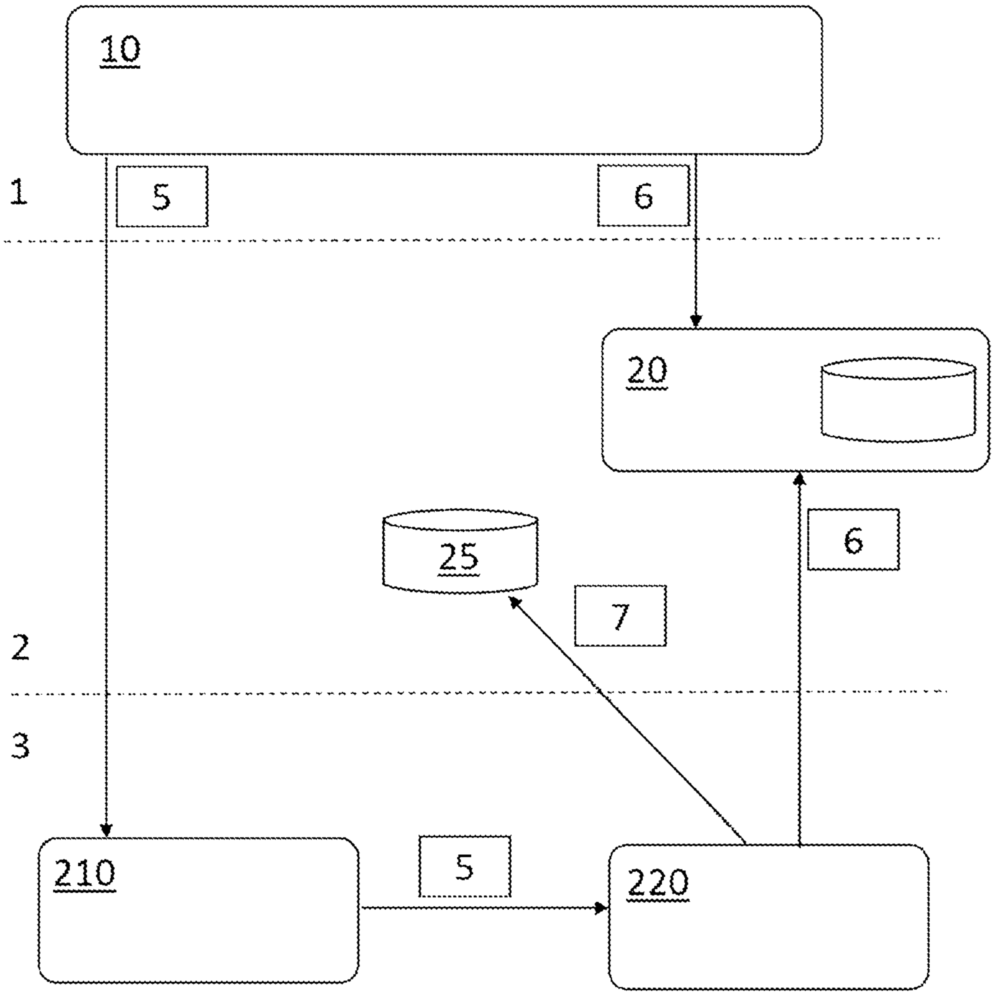
Fig. 1 (Prior art)
FIG. 1 shows a digital central bank currency system with coin deposit management units and a coin register of the central bank.

FIG. 1 shows a digital central bank currency system as is already known in its own right. The division of the system into an issuing layer 1, a system management layer 2, and a transaction layer 3 is represented by dashed lines.

A central bank entity 10 issues digital coin datasets 5. The central bank entity 10 additionally demands an initial registration of the digital coin dataset 5 in a coin register 20 of the central bank. Coin management units 210, 220 can exchange digital coin datasets and send registration demands to the coin register 20.

Transaction datasets 7 are stored in an optional transaction register 25. A transaction dataset 7 will comprise, for example, the transaction amount, a transaction ID, identifiers for the sender and recipient, here the coin management unit 210 as the sender and the coin management unit 220 as the recipient, and at least the register reference of the transmitted coin dataset 5.

The coin register 20 stores a register dataset 6 at least for each valid digital coin dataset 5. The register dataset 6 contains, for example, the amount of the coin dataset and a register reference. The register reference can be derived from the coin dataset 5 but does not allow the coin dataset 5 to be identified. In FIG. 1, the initial registration request sent by the central bank entity 10 contains the register dataset 6. It is illustrated in the Figure that the first coin management unit 210 receives the digital coin dataset 5 from the central bank entity 10. The digital coin dataset 5 can, however, also be issued indirectly from the central bank to a coin management unit of a user (for example, via a commercial bank) or have been received from another coin management unit.

The digital coin dataset 5 can be transferred from the first coin management unit 210 directly to the second coin management unit 220. The second coin management unit 220 can check the validity of the coin dataset 5 with the aid of the coin register 20. It can send a validity request, which contains the register reference derivable from the coin dataset 5 and optionally the amount, to the coin register 20. The coin register 20 checks whether the register reference is present and confirms if necessary that the coin dataset 5 is valid. Alternatively, the coin management unit 220 generates a new coin dataset and sends to the coin register 20 a registration request which comprises at least the register reference of the previously valid coin dataset 5 and a register reference of the new coin dataset. The new registration request is checked in the coin register 20. In the simplest case, the register reference of the new coin dataset is registered and the previously valid register reference deleted (or marked as invalid).

If a coin management unit 210, 220 generates a new coin dataset with the same amount and registers the new coin dataset instead of the previous coin dataset, this is also referred to as switching.

Coin management units 210, 220 can, however, also divide or combine coin datasets, i.e. generate a new coin dataset to be registered from multiple previously valid coin datasets or generate multiple coin datasets to be registered from a previous coin dataset. The coin register 20 then checks in particular whether the registration demand (with the associated multiple previous or new register references) is neutral in amount. WO 2020/212331 A1 describes corresponding examples. The present solution is, however, not linked to the masking of the amount of the coin datasets which is described therein or to the specific protocols of WO 2020/212331 A1 as shown, for example, in WO 2021/170646 A1.

The approach illustrated in FIG. 1 is in particular advantageous because neither the coin register 20 nor the transaction register 25 have to comprise coin datasets 5. DE 10 2020 004 121 A1 describes in detail a transaction register and its protection.

Figure 2:
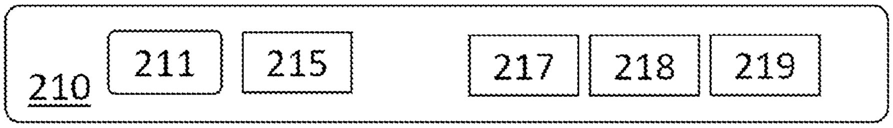
Fig. 2 (Prior art)
FIG. 2 shows a coin management unit with an execution unit and a coin dataset.

FIG. 2 shows a coin management unit 210 with its typical components. The coin management unit 210 comprises an execution unit 211 and at least one coin dataset 215. The execution unit 211 is generally configured as software and arranged to manage the stored coin datasets (send/receive coin datasets, send registration demands).

The coin management unit 210 furthermore comprises an identifier 217 of the coin management unit 210. Identifiers 217 are sometimes also referred to below as IDs, for example as a sender ID or recipient ID. A cryptographic key 218, possibly an asymmetric key pair, and a certificate 219 of the coin management unit 210 are further data elements of the coin management unit 210. The cryptographic key preferably serves to authenticate the coin management unit 210 and/or to sign data, in particular as part of a transaction. The certificate 219 can relate to the identifier 217 and/or the key 218, generally the public key of a key pair 218, of the coin management unit 210.

Data elements, for example a coin dataset or conditional transaction, are illustrated in FIGS. 1 to 4 by rectangular boxes. Functional units, for example the execution unit, are illustrated with rounded corners. Optional data elements or units are generally illustrated with dashed lines.

A coin management unit comprises at least one digital coin dataset and an execution unit for managing coin datasets.

Figure 3:
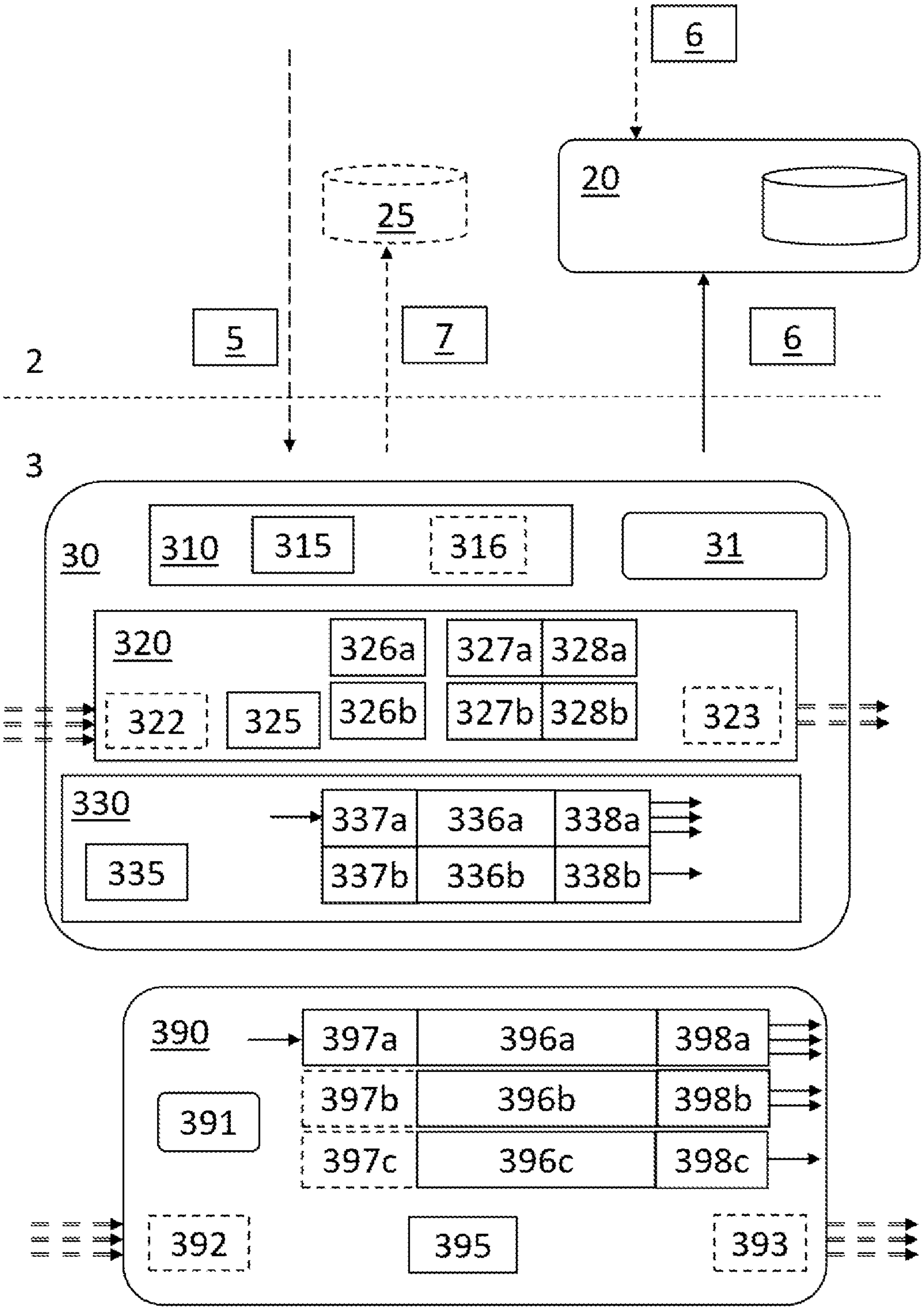
FIG. 3 shows a digital central bank currency system with a coin deposit management unit.

FIG. 3 shows a coin deposit management unit 30 with multiple coin management units 31, 310; 31, 320; 31, 330 which have a common execution unit 31, and a coin management unit 390 with an independent execution unit 391. Coin deposit management units comprise coin deposits of different users. There are multiple coin management units in the digital central bank currency system. There can additionally be multiple coin deposit management units.

For the sake of completeness, the coin register 20 of the central bank with register datasets 6, and the optional transaction register 25 with a transaction dataset 7, are also shown in the system management layer 2 of FIG. 3 in addition to a coin dataset 5.

The coin management unit 390 comprises, in addition to the execution unit 391, at least one coin dataset 395, generally multiple coin datasets, and at least two conditional transactions 396*a*, 396*b*, 396*c* with different read and/or write rights 397*a*, 398*a*, 397*b*, 398*b*, 397*c*, 398*c*. The differences are indicated in the Figure by means of arrows. Two conditional transactions can be configured with the same write rights and different read rights, with different write rights and the same read rights, or with different read and write rights. Additionally, conditional transactions (not illustrated) can also be present which have the same write and read rights.

Optional specifications 392, 393 could restrict the coin management unit 390 in terms of transactions, purely by way of example: the type of transaction, the transaction amount, or the transaction partner. As indicated by the three double arrows in both directions, in this example the coin management unit 390 is, however, to be restricted initially in terms of the transaction partner neither by its receipt specification 392 nor by its send specification 393. The compliance with the specifications both when (directly) executing a transaction and when creating a conditional transaction will be described in more detail below, with reference to FIGS. 5 and 7 respectively. The difference between normal transactions to be executed directly and the stored conditional transactions which are executed only when their condition is satisfied can also be seen better with the aid of these two Figures.

The first conditional transaction 396*a* can be read, according to read right 398*a*, by each third party (in particular each coin management unit or each coin deposit management unit) and of course by the user of the coin management unit. This is indicated by three arrows pointing to the right. The second conditional transaction 396*b* can, according to read right 398*b*, be read only by the user and by one or more specific coin management units (or one or more coin deposit management units). This is indicated by the two arrows pointing to the right. The third conditional transaction 396*c* can, according to read right 398*c*, be read only by the user such that only one arrow pointing to the right is illustrated.

The user only has a write right 397*a* to the first conditional transaction 396*a*. According to the write rights 397*b* and 397*c* of the second and third conditional transactions 396*b* and 396*c*, no one can modify these conditional transactions. Third parties cannot modify any of the three conditional transactions 396*a-c*.

The coin deposit management unit 30 of FIG. 3 has multiple, here three, coin deposits 310, 320, and 330 of different users and an execution unit 31 for managing coin datasets 315, 325, 335 of the coin deposits 310, 320, 330 of the digital central bank currency system. The coin deposit management unit 30 will generally comprise significantly more than three, for example more than 100, coin deposits.

The coin deposits 310, 320, 330 are coin deposit datasets. The coin deposits 310, 320, 330 consist of data elements such as the in each case at least one coin dataset 315, 325, 335 and further data elements. Each coin deposit 310, 320, 330 of FIG. 3 comprises the at least one coin dataset 315, 325, 335. The coin deposits 310, 320, 330 can each also comprise multiple coin datasets. The corresponding reference signs, such as 315, 325, 335, and 395 in FIG. 3, are thus intended to represent one or more coin datasets of the coin management unit 31, 310; 31, 320; 31, 330 and 390.

No conditional transaction is contained in the coin deposit 310. A conditional transaction 316 could optionally be applied. Alternatively, a specification of the coin deposit could, however, also exclude the possibility of conditional transactions being stored in the coin deposit 310.

The coin deposits 320, 330 each contain two conditional transactions 326*a*, 326*b* and 336*a*, 336*b*. The write and/or read rights 327*a*, 328*a*, 337*a*, 338*a* of the first conditional transaction 326*a*, 336*a* differ from the write and/or read rights 327*b*, 328*b*, 337*b*, 338*b* of the second conditional transaction 326*b*, 336*b*.

For the coin deposit 330 with the at least one coin dataset 335, the arrows again indicate the rights. According to write right 337*b*, no one has write access to the stored conditional transaction 336*b*. In contrast, according to write right 337*a*, the conditional transaction 336*a* can be modified by precisely one authorized person. This authorized person is generally the user but can also be the transaction partner. For example, in the case of a receive transaction for the coin deposit 330, the sender of the coin datasets which are contained in the conditional transaction could have the write right. In this way, a coin management unit which does not support any conditional transactions or, as is the case with the coin deposit 310, cannot store conditional transactions because of a specification could nevertheless store a conditional transaction together with a transaction partner.

According to the read right 338*b*, the second conditional transaction 336*b* of the coin deposit can be read only by the user. A third party who requests the conditional transactions of the coin deposit 330 which are present in the coin deposit management unit 30 thus sees only the first conditional transaction 336*a*. The read rights 338*a* are selected such that each coin management unit of the central bank currency system can read the first conditional transaction 336*a*.

For the coin deposit 320 with the at least one coin dataset 325, the double arrows indicate at the specifications 322, 323 how the specifications can be selected for the coin management units or coin deposits in the coin deposit management unit 30. As represented by the double arrows, for example, receipt specifications 322 can differ from send specifications 323. The specifications can here be specifications of the issuer of the coin deposit and/or the user. The specifications can specify for the coin deposit, for example, the transaction types, functions of the execution unit, receivers, senders, or amount limits. The coin deposit 320 can, for example, receive coin datasets from each coin management unit as a sender (3 double arrows) but only send coin datasets to selected recipients (2 double arrows) which are contained, for example with their ID or as a group, in the send specification 323. The send specification 323 of the coin deposit 320 thus restricts the coin deposit 323 to the sending of coin datasets (send specification) to specific recipients. The coin deposit 320 is thus unrestricted in terms of senders and partially restricted in terms of recipients.

For the sake of readability, the specifications of the further coin deposits are not illustrated in FIG. 3. The specifications of the coin deposits 310, 320, 330 of the coin deposit management unit 30 will differ from one another even if some coin deposits can of course contain uniform specifications. The execution unit 31 checks the specification of the respective coin deposit 310, 320, 330 before it executes a transaction, i.e. in particular sends a coin dataset of the respective coin deposit 310, 320, 330 or stores a received coin dataset in the coin deposit 310, 320, 330. The specifications are also checked before the conditional transaction is stored.

Each coin deposit 310, 320, 330 has its own ID, i.e. the identifier (ID) of the coin management unit, and optionally also comprises its keys and/or its certificates. Alternatively or additionally, in particular private keys and/or certificates can also be provided by the coin deposit management unit.

Each of the coin deposits 310, 320, and 330 is associated with a user. The association of the coin management unit ID with the username is, however, preferably not stored in the coin deposit and instead in a data structure which is external to the coin deposit (and contains the ID together with the full name of the user, a so-called tuple). The coin deposit management unit 30 here comprises three coin deposits 310, 320, 330 of different users.

It is conceivable that non-restrictive specifications such as the specifications 392, 393, and 322 are either coded explicitly (for example, by: "*" or "all" for any desired IDs) or omitted (no specification=>no restriction).

A send or a receive specification does not have to comprise only precisely one ID or multiple IDs and instead can also comprise groups of IDs or combinations of groups and individual IDs. A group of IDs can be indicated, for example, with an ID mask. The ID mask specifies only parts of an ID which have to agree such as, for example, "ABC?? 1311560*". Thus, for example, all the IDs which have a specific starting part and/or middle part (in the example, "ABC" is the start and "1311560" the middle) are permissible irrespective of the specific values in further parts (in the example, the two characters "??" or a serial number following at the end of the ID) of the respective ID.

An issuer of coin deposits 310, 320, 330 could, in an example for one user, provide a coin deposit 300 with coin datasets 335 and fix in advance in a send specification of the issuer the single permissible recipient or a single permissible recipient group.

Figure 4:
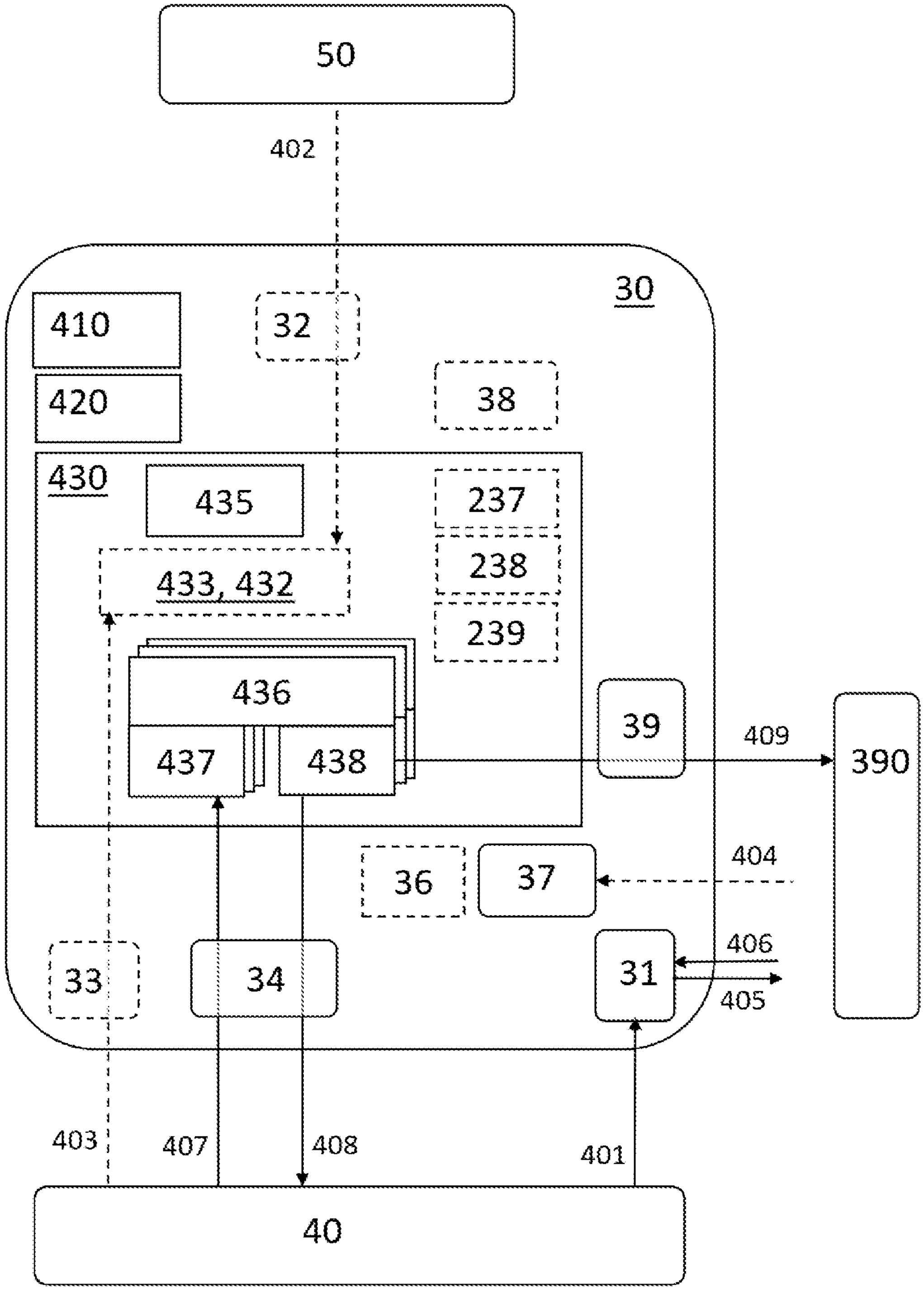
FIG. 4 shows a coin deposit management unit.

The components of the coin deposit management unit 30 will be considered in more detail with reference to FIG. 4. FIG. 4 shows a coin deposit management unit 30, a user unit 40, an issuer entity 50 and a further coin management unit 390. The further coin management unit 390 can correspond to the coin management unit 390 from FIG. 3 but could alternatively also be any other coin management unit, i.e. also a coin management unit of a further coin deposit management unit.

The coin deposit management unit 30 comprises coin deposits 410, 420, 430 and the execution unit 31. The coin deposit dataset of the coin deposit 430 is illustrated in greater detail; it contains precisely one or multiple coin datasets 435 and optionally specifications 432, 433.

Contained in the coin deposit 330 are, for example, an identifier 237, at least one key 238 and one certificate 239 (here the certificate of the coin management unit, formed by the coin deposit 430 and the execution unit 31 of the coin deposit management unit 30), as optional but generally present data elements.

The specifications comprise issuer specifications 432 and user specifications 433. The issuer specifications 432 are fixed by the issuer of the coin deposit. They can be contained already in a coin deposit demand 402. The user specifications 433 can, in contrast, be freely selected by the user, at least as long as they are narrower than a (possibly present similar) issuer specification 432.

Given a completely restrictive issuer specification such as, for example, "no sending" or "no receiving", the user no longer has any freedom of choice. Given an unrestricted (possibly not present) functional specification of the issuer such as "send to all" and/or "receive from all", the user can completely freely select a user specification. Given a partially restrictive functional specification of the issuer such as "send only to ID group 1 or to ID group 2", the user can select a narrower user specification such as "send only to ID1 from ID group 1 or to ID2 from ID group 1".

The coin deposit management unit 30 can comprise a coin deposit creation unit 32 which can process a coin deposit demand 402 from the issuer unit 50.

The coin deposit management unit 30 can comprise a user specification unit 33 which can process a configuration demand 403 from the user unit 40. A user can send the configuration demand 403 to the coin deposit management unit 30 from its user unit 40 such as a cellphone, PC, or terminal.

The user specification unit 33 checks in particular whether the specifications 433, contained in the configuration demand 403 and selected by the user, for its coin deposit 430 are narrower than the issuer specifications 432 of the coin deposit 430 which are present. In this case, the specifications in the configuration demand 403 are stored as user specifications 433 in the coin deposit 430. In the coin deposit management unit 30, the user specification 433 can always be narrower than the issuer specification 432 and comprise the restrictions of the issuer specification 432. It is then sufficient that the execution unit 31 checks the user specification 433. This variant is preferred when the permissible recipients and/or senders are indicated in the functional specification 432, 433. On the other hand, the execution unit 31 can also be configured, preferably for other specifications or encodings, to always check both specifications 432, 433. The user specification 433 then does not have to comprise the restrictions of the issuer specification 432 which may be present. The management of the user specification(s) 433 can thus be simplified.

The coin deposit 330 can be created or have been created as a new coin deposit at the demand 402 of the issuer unit 50. The coin deposit demand 402 contains as a data element at least one, generally multiple, issuer specifications 432 for the new coin deposit 330. A corresponding method will be described in detail below with reference to FIG. 6.

The execution unit 31 is configured to exchange the coin datasets of the coin deposits 410, 420, 430 in transactions 405, 406 with other coin management units of other users of the central bank system and send registration demands (not illustrated in FIG. 4) to the coin register 20 (not illustrated in FIG. 4).

The user can send a transaction demand 401 from their user unit 40 to the coin deposit management unit 30. A corresponding method for processing the transaction demand 401 will describe send transactions 405, for the case of sending a coin dataset, with reference to FIG. 5. The transaction demand 401 is a transaction request of the user unit 40 of the user which can be identified as a request of the user in particular on the basis of an authentication data element or a preceding authentication of the user unit 40. The execution unit 31 checks the specifications 432, 433 before the send transaction 405 is (or is not) executed depending on the result of the check. Checking of the specifications in the case of receipt of coin datasets (receive transaction 406) is also described with reference to FIG. 5.

The specifications 432, 433 can be not only direction specifications (send/receive) but, for example, also specifications for conditional transactions or specifications for transactions with a return service.

Conditional transactions 436 which differ in their read rights 438 and/or write rights 437 are stored in the coin deposit 430 or encompass all the coin deposits. The conditional transactions are stored on request and later, after the condition has been satisfied, a transaction which corresponds to the stored conditional transaction is executed. A corresponding method will be described in more detail with reference to FIG. 7.

The coin deposit management unit 30 comprises a user access unit for conditional transactions 34 and a third-party access unit for conditional transactions 39. The units 34, 39 are illustrated separately but can take the form of an access unit for conditional transactions 34, 39 or take the form of subunits of the execution unit 31.

The user can read 408 one, multiple, or all the conditional transactions 436. The user unit 40 sends a corresponding read request of the user and the user access unit for conditional transactions 34 checks the access rights 438 of the conditional transactions 436 to be read. The user can modify 409 a conditional transaction 436. The user unit 40 sends a corresponding modification request of the user and the user access unit for conditional transactions 34 checks the access rights 437 of the (already stored) conditional transactions 436 to be written. The user can, for example, read all the conditional transactions 436 but only modify specific conditional transactions 436. Third parties, such as the further coin management unit 390 illustrated, can also read 409 conditional transactions. They can send a read request for one, multiple, or all conditional transactions (readable for them). The third-party access unit 39 checks the read rights 438 of the conditional transactions 436 for the third parties. Only the conditional transactions 436 for which the corresponding read rights exist are read for the third parties. It would be conceivable that all the conditional transactions 436 in which the third party is or could be a transaction partner (group indications) have corresponding read rights. However, a third party can preferably also read only specific conditional transactions 436 from the group of the conditional transactions 436 in which it is mentioned as a transaction partner (with its ID) or could be the transaction partner (group indication).

A key management module 38 of the coin deposit management unit 30 is preferably a high-security module for cryptographic keys. The key management module 38 can store private keys of the coin deposits 410, 420, 430. The key 338, stored in the coin deposit 430, of the coin deposit management unit 30 is, for example, a public key of an asymmetric key pair. The associated private key is stored in the key management module 38 (and used only therein). The key management module 38 encrypts, authenticates, or signs, for example, data for the execution unit 31 with the private key of the coin deposit. Independent key pairs can be provided for these different purposes. The key management module 38 can moreover create derived keys, such as session keys, and provide them to the execution unit 31.

In addition to the management of the transaction keys (keys required for the transactions), the key management module 38 can also be used for the encrypted storage of the coin deposit datasets.

The datasets of the coin deposits 410, 420, 430 (coin deposit datasets) are preferably stored in encrypted form in the coin deposit management unit 30. The corresponding coin deposit 410, 420, 430 is decrypted when necessary, i.e. for example in the case of a transaction or configuration demand for the coin deposit 430. Only the required coin deposit 430 is decrypted in each case, wherein in particular an individual key for the coin deposit 430 can be used. The key management module 38 can, for example, execute the decryption (and a subsequent re-encryption). If the key management module 38 contains a derived key (optionally a common one for multiple coin deposits), it can alternatively provide the derived key for the decryption/encryption of the coin deposit 430 to the execution unit 31.

The coin deposit management unit 30 checks for the conditional transactions of the coin deposits 410, 420, 430 whether the condition contained therein has been satisfied. A condition checking unit 37 can be provided in the coin deposit management unit 30. The condition checking unit 37 checks, in particular continuously, at regular time intervals, or in response to an external event such as a trigger event 404, whether a condition (such as time, date, threshold value exceeded, external event, request received) of the conditional transaction 436 has been satisfied. Optionally, it can use a checklist 36 in which at least the conditions to be satisfied of the conditional transactions of the coin deposits 410, 420, 430 of the coin deposit management unit 30 are stored. The checklist 36 simplifies the checking of the conditions not only when the coin deposit data are stored in encrypted form. If the condition of a conditional transaction is satisfied, a transaction is executed which corresponds to the conditional transaction.

In order to be able to execute a transaction with a return service, the coin deposit management unit 30 comprises a return service unit (not illustrated in the Figure). The return service unit generates, for example, response data which are to be sent in a response as a return service for a dataset (or multiple coin datasets) received in a receive transaction 406. The return service unit provides a return service which can be set, for example, in return service data of the coin deposit 430. Alternatively or additionally, in the present case it is to be possible for a return service to be indicated in a conditional transaction. The return service specifications could restrict the return service functions permissible for the coin deposit 430. Given the return service functions available in the return service unit, specific return service functions, encodings, or subtypes are thus excluded selectively for the coin deposit 430.

All the aspects described with reference to FIG. 4 and which are not specifically for the management of coin deposits of different users can also exist in a coin management unit with an independent execution unit (only, for example, the units 34, 36, 37, and 39 or multiple coin deposits with their own IDs).

Figure 5:
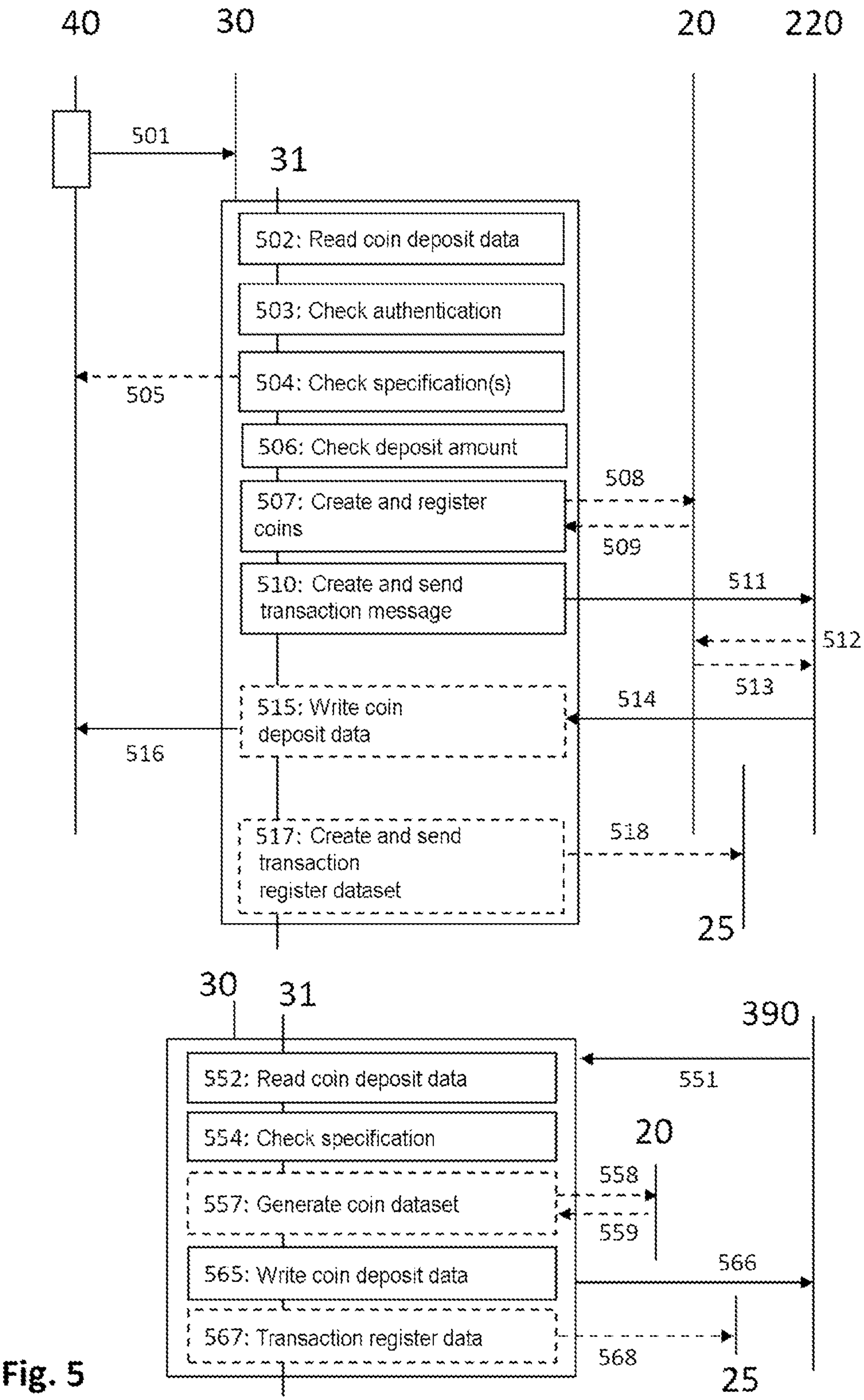
FIG. 5 shows a flow diagram for a method with a transaction demand.

FIG. 5 shows the method sequence 501 to 518 in the coin deposit management unit 30 after receipt of a transaction demand 501 from a user (or their user unit 40) and the method sequence 551 to 568 when coin datasets are received by a coin management unit 390.

The transaction demand 501 comprises an ID of a coin deposit 430 in the coin deposit management unit 30 and demands the sending of an amount from this sender ID to a recipient ID. In step 502, the secure execution unit 31 of the coin deposit management unit 30 reads the coin deposit dataset of the coin deposit 430 with the sender ID. The key management module 38 preferably provides either the decryption key, which is selected individually for the coin deposit 430 on the basis of the ID, or the already decrypted coin deposit dataset to the execution unit 31. In steps 503, 504, 506, the execution unit 31 executes multiple checks before it executes the demanded transaction in steps 507 to 516. FIG. 5 shows the preferred sequence of the checking steps. First, an authentication is checked 503, generally the authentication of the user. A corresponding authentication value can be contained in the transaction demand 501 or be demanded and received separately in step 503.

At least one (of the) specification(s) 432, 433 of the coin deposit 430 with the ID is checked in step 504. In the present example of a simple send transaction, a check is made as to whether the recipient ID is an ID according to send specifications in the issuer and/or user specifications 432, 433. If the coin deposit 330 is unrestricted according to the issuer specification 432 in the receiving direction or if the issuer specification 432 in the receiving direction is satisfied, the user specification 433, which comprises for example an ID group and two IDs of recipients, is checked. If the recipient ID of the transaction request does not correspond to the specifications 432, 433, the transaction demand 501 is rejected and the user 40 receives a rejection message 505. If in contrast the recipient ID is permissible because it is an ID from the ID group or corresponds to one of the two IDs of recipients in the user specification 334*a*, the method is continued (and the transaction executed). In step 506, a check is made as to whether the amount of the deposit, the amount of the coin dataset 435 in the coin deposit 430, or the total of the amounts of the coin datasets 435 in the coin deposit 430 is greater than the amount demanded.

The coin deposit management unit 30 preferably sends in transactions precisely one coin dataset, the amount of which corresponds to the transaction amount, instead of sending the transaction amount as the total of the amounts of multiple coin datasets. If the amount demanded corresponds to the amount of a coin dataset present in the coin deposit, the following steps 507 to 509 are omitted. In step 507, a new coin dataset is created, the amount of which corresponds to the amount demanded. An existing coin dataset is preferably divided into the new coin dataset and a further coin dataset (amount=difference between the amount of the coin dataset present and the transaction amount). Alternatively, two or more coin datasets which are present could be combined to form the new coin dataset (and optionally a further coin dataset or multiple further coin datasets). A registration demand 508 for the new coin dataset (or its register reference) is sent to the coin register 20. The coin register 20 confirms 509 the registration.

In step 510, the execution unit 31 then creates a transaction message 511 which is sent to the coin management unit 220 with the recipient ID, in particular of another user of the central bank system. The transaction message 511 comprises a transaction ID, the ID of the coin deposit 430, the ID of the other coin management unit 220 as the recipient ID, and the new coin dataset. Optionally, the transaction message 511 contains a transaction reference text which generally originates from the transaction request 501, and/or an authentication value which is generated for the transaction with the aid of the private key of the coin deposit 430. Reciprocal authentication of the two coin management units (430, 31; 220) involved is preferably performed in the transaction, in particular therefore in step 511. The step 510 of creating and sending the transaction message 511 can optionally or alternatively proceed in multiple substeps with a plurality of exchanged submessages (only for example for the authentication).

The other coin management unit 220 optionally generates an independent coin dataset which in particular has the same amount as the received new coin dataset, sends a registration request 512 for its independent coin dataset to the coin register 20, and thereupon receives a registration confirmation 513 from the coin register 20. The coin management unit 210 sends a transaction conformation 514 to the coin deposit management unit 30.

In step 515, i.e. preferably only after the transaction confirmation 514 has been received, the execution unit 31 stores the modified coin deposit data of the coin deposit 430. Encryption of the coin deposit data for individual coin deposits can, as described above, take place, again optionally with the aid of the key management module 38.

A transaction confirmation 516 can be sent to the user 40. In preferred variants, in step 517 a transaction register dataset 518 is created and sent to the transaction register 25.

A JSON format is preferably used for the transaction request 501 and/or the transaction message 511. A first standard format, in particular the JSON format, is preferably used for messages within the transaction layer 3. It should, however, be noted that the contents of the transaction request 501 and/or the transaction message 511 can also be transmitted separately from one another. For example, an authentication value can be transmitted only in step 503 or a recipient ID only in step 504 and/or authentication of the coin management unit 220 (or reciprocal authentication) can be executed first, before a coin dataset is exchanged.

The second sequence shown in FIG. 5 is triggered by the receipt of a transaction message 551 or receive transaction from a coin management unit 390. The transaction message 551 contains at least one ID of a coin deposit in the coin deposit management unit 30 and at least one coin dataset. The coin management unit 390 therefore wants to send a coin dataset to the coin deposit. The secure execution unit 31 checks again, however, whether the transaction corresponds to the specifications of the coin deposit.

First, the coin deposit data of the coin deposit with the indicated ID are read 552. Reading 552 of the coin deposit data will—as above—comprise decryption. Optionally, authentication of the coin management unit 390 is checked or reciprocal authentication is executed. Then the secure execution unit 31 checks 554 the specifications of the coin deposit. If receiving is, for example, completely restricted for the coin deposit, the transaction message 551 is rejected. However, in the example, receiving is partially restricted for the coin deposit by a sender specification of the issuer. The secure execution unit 31 therefore checks whether the ID of the coin management unit 390 satisfies the sender specification of the issuer for the coin deposit. If not, the transaction is rejected; if it does, the transaction is executed. The secure execution unit 31 preferably generates an independent coin dataset using the received coin dataset. It can generate 557 an independent coin dataset of the same amount and, by means of a registration demand 558 and registration confirmation 559, register it in the coin register. The coin deposit data of the coin deposit are stored 565 (in encrypted form) and a transaction confirmation 566 is sent to the coin management unit 390. Optionally, a recipient of coin datasets in the digital central bank currency system can also be obliged to generate 567 a transaction register dataset and send it 568 to the transaction register 25.

Figure 6:
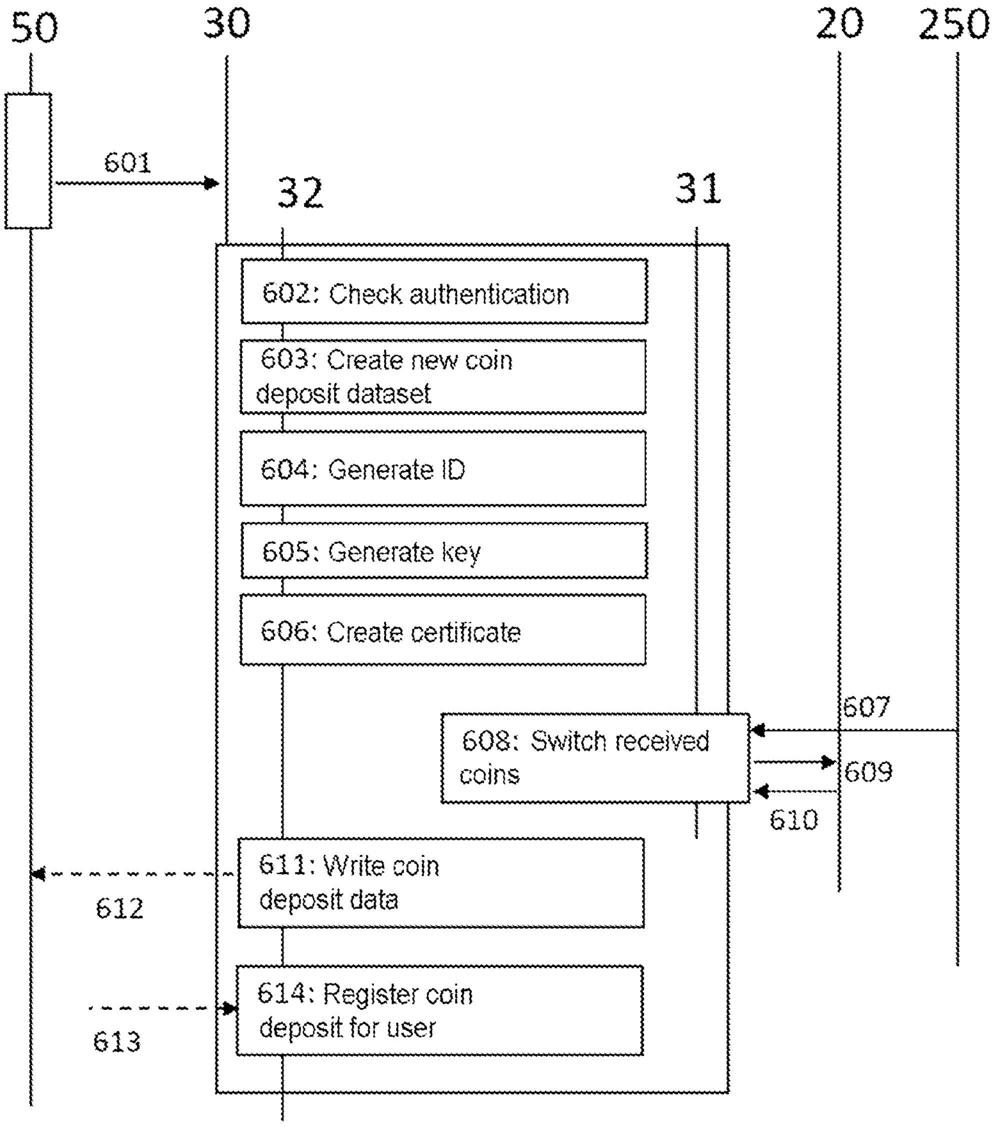
FIG. 6 shows a flow diagram for a method with a coin deposit demand.

FIG. 6 shows the sequence of a method for creating a new coin deposit.

An issuer 50 of the new coin deposit sends a coin deposit demand 601 to the coin deposit management unit 30. The coin deposit creation unit 32 of the coin deposit management unit 30 processes the coin deposit demand 601 and creates the new coin deposit. First, the authentication of the issuer is checked 602. If the authentication check fails, for example because the requester is not an issuer but a user, the request is rejected (and no new coin deposit is created). The coin deposit management unit 30 comprises a plurality of coin deposits which are associated with different users. The coin deposits comprise different specifications, in particular different functional specifications. The plurality of coin deposits have been created by a plurality of issuers. The plurality M of coin deposits is of the same order of magnitude as a plurality B of users (M=a*B, for example where 1<a<9 for 1 to 9 coin deposits per user). The plurality of coin deposits M is several orders of magnitude greater than the plurality H of issuers: M>>H (for example: M=b*H where b>50, preferably >100).

In step 603, a coin deposit dataset for the new coin deposit is created. The data elements of the created coin deposit dataset are initially empty and/or occupied by a standard value. In the step of creating 603 the coin deposit dataset, the individual encryption key for the coin deposit can be provided, in particular by the key management module 38. The data elements, such as specifications and coin datasets, or in particular also an identifier, key, and/or certificate, are then provided in further steps 604-608 or taken from the coin deposit demand 601.

A specification (or multiple specifications), contained in the coin deposit demand 601, of the issuer are stored as an issuer specification or specifications in the coin deposit dataset.

First, an identifier is generated 604 for the new coin deposit in the coin deposit management unit 30. The new coin deposit forms, together with the secure execution unit 31, a new coin management unit. Identifiers are associated with coin management units in the system. The identifier is in particular configured as a URI (unified resource identifier) or URN (unified resource name) and contains a universal unique ID (UUID). An identifier as a URN has, for example, the following format: "coin-management-unit: my-coin-deposit-bank.com: UUID". A UUID can be used as an identifier or as part of a URN. The UUID is encoded according to RFC 4122. It correspondingly comprises a half-byte M which indicates a version of the UUID, and a half-byte N which indicates a variant of the UUID. Further bits of the UUID are then used to at least partially encode a functional specification. Bits of the half-bytes S and/or V can, for example, be used here: "xxxxxxxx-xxxx-Mxxx-Nxxx-SVxxxxxxxxxx" which would otherwise be occupied by random numbers. In a first bit of the UUID, it is encoded that the coin deposit is present in a coin deposit management unit. In a second bit of the UUID, it is encoded whether a direction-related functional specification exists ("0": no direction specification", "1": "direction specification"). In a third bit of the UUID, it is encoded whether conditional transactions are permissible ("0": "no conditional transactions" or "1": "conditional transactions permissible"). In a fourth bit of the UUID, it could optionally be encoded whether a return service is permissible ("0": "no return service permissible", "1": "return service permissible"). For conventional coin management units, the 3 bits of the UUID could thus be set to "000".

For the new coin deposit, according to coin deposit demand 601, the sending is to be restricted to two different recipient groups and a said variant of conditional transactions be permissible which can comprise a return service. The three bits of the UUID are therefore set for the new coin deposit to "111". As expected, only one direction specification (or multiple direction specifications) will exist for the plurality of coin deposits in the coin deposit management unit 30 but conditional transactions or return services will be impermissible. For most coin deposits, the three bits would therefore be encoded with "100" in their URN or UUID.

In a further step, at least one key for the coin deposit is provided or generated. A key pair, comprising a public key and a private key, is generated preferably by the key management module. The private key can optionally remain in the key management module. Alternatively, it is stored in an encrypted form in the (possibly additionally encrypted) coin deposit. The public key is stored in the coin deposit. The key or the key pair preferably serves to authenticate the new coin management unit.

In a further step 606, a certificate for the coin deposit is created. The certificate comprises at least the ID and/or the public key of the coin deposit. Certificates confirm for third parties the authenticity of the data elements contained. The certificate is—as well as the ID or the public key—a (public) data element, provided for passing to third parties such as other coin management units, of the coin deposit dataset. The functional specifications with respect to return services are therefore not contained in the certificate. The precise restriction in the sending and receiving direction, i.e. here the two permissible recipient groups, is also treated as internal information. However, a (further) part of the functional specifications is contained in the certificate. The certificate contains, for example, the indication that the coin deposit is unrestricted in the receiving direction ("no sender specification") and is partially restricted in the sending direction.

Optionally, the secure execution unit 31 receives 607 one or multiple coin datasets for the new coin deposit. The secure execution unit will—as already described above—generate 608 an independent coin dataset (or multiple independent coin datasets) for the received coin dataset(s). It sends a registration demand to the coin register 609 and receives a confirmation 610 for the registration of the independent coin dataset(s) in the coin register 20. Independent coin datasets of the same amount are generally generated and registered (switching). It is not shown in the Figures that preferably a transaction register dataset is again transmitted to the transaction register 25.

In step 611, the coin deposit dataset, in particular including the said generated data elements, the externally provided data elements, and optionally at least one coin dataset, is stored. It is preferably stored in an individually encrypted form. The encryption can relate to the whole coin deposit dataset or to individual data elements (D1, D2, D3) (for example: "encrypt (D1,D2,D3 . . . )" or "encrypt (D1), encrypt (D2), encrypt (D3) . . . ").

The coin deposit creation unit 32 can send a coin deposit confirmation 612 to the issuer 50 after the creation of the new coin deposit.

A step 614 of registering the new coin deposit for a user can take place at different points in time. The association between a unique username, possibly including "given name, family name, date of birth and/or address" or "tax number with or without 'given name, family name'" of the user, and the coin deposit, i.e. the ID of the coin deposit, is generally stored in an external data structure. If the user is already mentioned in the coin deposit demand 601, the association or the registration 614 can take place as soon as the ID of the coin deposit is fixed (in the example: from step 604).

With a separate association demand 613, which relates to at least one already created coin deposit not yet associated with a user, the registration 614 in FIG. 6 is triggered. The issuer 50 could thus allow a plurality of new coin deposits to be created (steps 601 to 612) and only when necessary (at a later point in time and possibly individually) be associated with a user (steps 613, 614). It is conceivable to demand the association simultaneously for multiple coin deposits. The association demand 613 can be sent by the issuer. The user is generally then informed that a new coin deposit has been created for them (for example, including indication of the ID or access data). Alternatively, the user or a third party can send the association demand 613. The issuer communicates an authorization code (for example, in an email and/or as a barcode) to the user. The user or a third party which first verifies the identity of the user (for example, by means of PostIdent or VideoIdent methods) then sends the authorization code with or in the association demand 613.

At the time of the registration 614, the coin deposit preferably does not yet comprise any coin datasets. Thus, all the transactions in the system can be associated with users, for example on the basis of the transaction register 25.

It is now apparent that the aspects or features described with respect to individual Figures can also be used individually or jointly in other Figures. The new coin deposit according to FIG. 6 can, for example, be a coin deposit according to one of FIGS. 2 to 9. In order to avoid repetition, not all details are repeated again for each Figure or all alternatives mentioned in each case with respect to details. The key management, the communication with the coin and the transaction register, and in particular the specifications which can be combined in different ways are just some appropriate examples.

Figure 7:
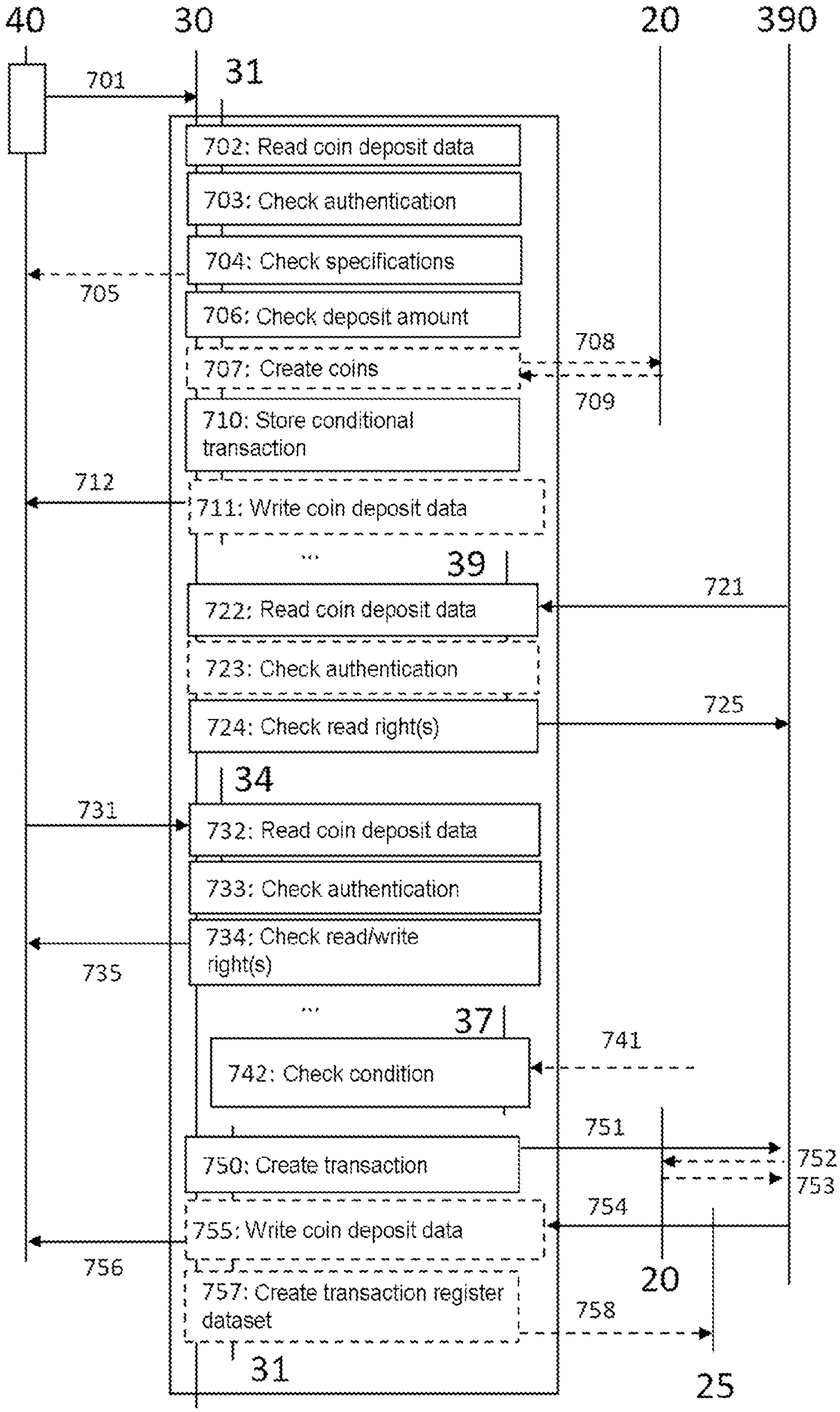
FIG. 7 shows a flow diagram for a method with a demand of a conditional transaction.

FIG. 7 shows the sequence of a method when a conditional transaction is demanded. The demand of a conditional transaction 701 by the user 40 first triggers almost the same steps 702, 703, 706, 707, 708 as a normal transaction to be executed immediately with the steps 502, 503, 506, 507, 508 in FIG. 5. Because a send transaction is, as in FIG. 5, additionally considered as a conditional transaction in FIG. 7, the subsequent steps 750 to 758 correspond to the known steps 510 to 518, respectively. Such already described steps will be described only briefly.

The reading of the coin deposit data 702 of the coin deposit indicated with its ID in the transaction demand 701 and the checking of the user authentication 703 of the user 40 take place, for example, as described with reference to FIG. 5.

Also analogously, a rejection 705 of the demand 701 takes place if it is established when checking 704 the functional specification(s) of the coin deposit that the transaction is not permissible for the coin deposit.

In the checking step 704, (at least also) one specification for conditional transactions is then checked as the functional specification. If the coin deposit were to be restricted, for example, to another type of conditional transactions and/or other conditions, the demand would be rejected. In addition to the functional specification, a direction specification and/or a specification of amount can, for example, optionally be checked, in the present example of a send transaction the specification for the sending direction and a possibly present amount limit for sending.

The further steps of checking the deposit amount 706 and the creation 707 and registration of a coin dataset 708, 709 for the transaction could again take place analogously to FIG. 5.

A conditional transaction is first stored 710. The associated transaction has thus not yet been executed and instead is only executed later when the condition contained in the transaction has been satisfied. The conditional transaction comprises the condition to be checked and data elements of the subsequent transaction. As illustrated in FIG. 4, the storage can take place in a memory for conditional transactions 436 of the coin deposit 430 or in a memory 36 which encompasses all the coin deposits for conditional transactions. In a variant, only the condition together with a link to the conditional transaction is stored in the memory 36 as a checklist. It should be noted that the sequence illustrated, first checks 703 to 705 and then temporary storage 710, ensures that the subsequent transaction can actually be executed for the conditional transaction as soon as the condition has been satisfied.

In an optional step 711, the secure execution unit 31 stores the coin deposit dataset, in particular if the coin deposit data have been modified. The storage 711 or the storage 710 can again comprise encryption of the coin deposit data, as described above. The coin deposit data have, for example, been modified if the memory 436 of the coin deposit is used. It is also possible with the optional steps 707 to 709 that a coin dataset for the conditional transaction has already been generated. The coin dataset for the conditional transaction can be stored in the coin datasets of the coin deposit. It is preferably marked there as a coin dataset which is reserved or blocked for the conditional transaction. In an alternative, the coin dataset for the conditional transaction could be temporarily stored in the conditional transaction itself, in particular if the memory 436 of the coin deposit is used. In a further alternative, the coin dataset for the conditional transaction is created only after the temporary storage 710. There are various options for ensuring the executability of the subsequent transaction for the stored conditional transaction. The transaction amount can be deducted from the available deposit amount (for steps in which the deposit amount is checked such as step 706 or 506). If the available deposit amount is provided as a separate data element of the coin deposit, it is reduced. An amount reserved for conditional transactions could also be provided as a data element of the coin deposit dataset. A further option which saves on memory space would be not only to take the available coin datasets into account in the steps 506, 706 in which the deposit amount is checked, but also to read the temporarily stored conditional transactions of the coin deposit.

The ellipses after step 711 and after step 734 in FIG. 7 indicate that the further steps 721 to 758, and 741 to 758, follow only at a later point in time. The processing of the transaction request 701 for a conditional transaction is complete.

The execution of a transaction which corresponds to the conditional transaction takes place only if and/or only when the condition has been satisfied. Illustrated in FIG. 7 is a step of checking the condition 742 which is executed, for example, at regular intervals of time or in response to the receipt of a checking trigger 741. Optionally, the condition checking unit 37 of the coin deposit management unit 30 executes the check.

The stored conditional transaction can then be read or written 721-725, 731-735 by third parties or by the user according to their write and/or read rights.

In the example in FIG. 7, another coin management unit 390, which is preferably associated with another user, sends a read request 721 for a coin deposit. The read request can refer to the reading of

- precisely one conditional transaction from the coin deposit, which transaction is indicated on the basis of its transaction number or a reference number,
- a selection of conditional transactions of the coin deposit, which conditional transactions satisfy,
- for example, a certain criterion such as transaction type or transaction partner, or
- all the conditional transactions of the coin deposit.

The coin deposit data are read 722 and optionally the authentication of the requesting coin management unit 390 checked 723. After the read rights are checked 724, the conditional transaction or transactions is or are provided 725 to the coin management unit 390 (are read). Multiple conditional transactions may be read, wherein in each case only those conditional transactions for which there are read rights are read from the conditional transactions of the coin deposit, in total or according to the demanded selection. In principle, an external write request could take place in an analogous fashion, in particular if the request comprises authentication of the user in addition to the authentication of the third party.

In the example in FIG. 7, the user sends a write or read request 731 for their coin deposit from their user unit 40 to the coin deposit management unit 30. A write request refers to precisely one conditional transaction. The read request can in turn relate to precisely one conditional transaction, a selection of conditional transactions, or all the conditional transactions. The coin deposit data are read 732 in the coin deposit management unit 30, possibly including the necessary decryption steps, and the authentication of the user is checked 733. The write and/or read rights are then checked 734. Depending on the presence of the read and/or write rights, the conditional transaction is written (modified or deleted) or the conditional transaction or transactions is or are sent 735 to the user unit 40 (and thus read).

The conditional transaction can comprise, for example, a time condition. The send transaction is to be executed only on a certain date or only at a certain point in time (for example, after 36 hours or after 23:00 or on a certain day of the week).

A check of the condition 742, which may have failed, can have been performed already before the read and/or write demands 721, 731.

There are conditional transactions for which a transaction is executed only once, for example at a point in time (with date and time of day) or in response to a trigger which is contained in the condition. For other conditional transactions, a corresponding transaction can be executed multiple times. If, for example, a conditional transaction contains an offer for a transaction with a return service which refers to coin management units of a specific group, the read right can, for example, be allocated for this group. Irrespective of whether the coin management units recognize the conditional transaction only by reading the conditional transaction or otherwise, different coin management units of the group could accept the offer one after the other, for example by sending a coin dataset with the required amount, and receive the return service. For example, the coin deposit can send a digital entrance ticket for an event to the coin management unit as a return service.

The conditional transaction can comprise a security value. Not until or only if the security value is provided to the secure execution unit is the transaction executed. The security value can be a random number or be a cryptographic security value which is derived in particular from the data of the conditional transaction (such as a hash value or a signature, concerning a part of the conditional transaction or the conditional transaction, respectively). The security value can be received in particular as or in the checking trigger 712.

The conditional transaction can comprise an external trigger event. The occurrence of the external trigger event is preferably received in or with the checking trigger 712 (from a third party or the transaction partner). The contents of the data received with the checking trigger 712 are then checked. Alternatively, the secure execution unit can check, for example by a request to an external server or an external data structure (such as a blockchain or database), whether the trigger event has occurred.

The conditional transaction can moreover comprise a time limit (execution before a point in time or date). The condition, such as a security value or an external event, must therefore be satisfied before the time limit is reached. After the time limit has been reached, the conditional transaction is no longer executed. A temporarily stored conditional transaction is deleted after its time limit has expired.

A conditional transaction is optionally executed precisely once or multiple times. The number of executions of the conditional transaction can be indicated in the conditional transaction.

A specification for conditional transactions can, for example, indicate a permissible type or types of the condition, such as a time condition, security value, and/or external event. Alternatively or additionally, a specification for conditional transactions can contain a type of the conditional transaction which is permissible for the coin deposit. For example, the specification can indicate whether a conditional send transaction is permissible, possibly unrestricted or partially restricted according to a general send specification or according to a separate send specification for conditional transactions. Analogously, the specification can indicate whether a conditional receive transaction, a conditional transaction with a return service, or a conditional transaction according to a specific schema (standard 1 or proprietary 2) is permissible. Such specifications for conditional transactions can have been set in particular by the issuer in advance for the coin deposit and/or selected by the user. As already mentioned, they restrict the coin deposit functionally to certain functions from the available functions which the secure execution unit provides.

The further steps of creating 720 the transaction (message), exchanging at least one coin dataset 721 to 724, writing 725 the coin deposit data, confirming the transaction 726, and registering the transaction in the transaction register 727, 728 have already been described with reference to FIG. 5.

In the same way that a coin deposit can comprise multiple direction specifications and specifications of amount, the coin deposit can alternatively or additionally also comprise a plurality of specifications for conditional transactions (such as specifications from the issuer and/or user for the different types and/or directions).

It is not illustrated separately in FIG. 7 that a conditional transaction is automatically deleted. For example, if the conditional transaction has reached its execution limit (such as the number of executions or the duration of the possible execution) or has become unsatisfiable, it is deleted. It can thus be deleted from the execution unit 31 (and/or the checking unit 37), in particular if a corresponding transaction (or multiple corresponding transactions) is (or are) executed or has (or have) been executed, if the condition can no longer be satisfied, or after a limited duration has expired.

It should be noted that the method would proceed in an analogous fashion to FIG. 7 if the roles of the coin management units 31, 410, and 390 involved were swapped. The conditional transactions can thus be stored in the coin management unit 390 and be read or written by another coin management unit, possibly another coin deposit management unit 30. Only a few steps, such as reading the coin deposit data, are simplified (no decryption).

Figures 8, 9:
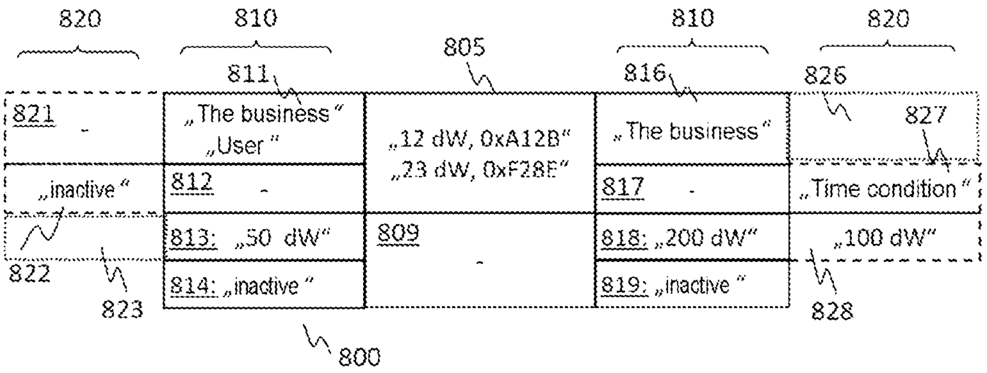
FIG. 8 shows an exemplary embodiment for specifications of a coin deposit.
FIG. 9 shows an exemplary embodiment of a list with conditional transactions.

Different aspects of the specifications are described in the example in FIG. 8, as could exist in principle and with different content in each of the discussed coin deposits or coin management units.

Multiple specifications 811-828 are illustrated as data elements and two coin datasets are illustrated symbolically and in simplified fashion in the coin datasets 805 (amount 13 or 23 with "dW" as digital currency units of the central bank currency).

The coin deposit or the coin management unit comprises, on the one hand, issuer specifications 810 and user specifications 820. On the other hand, it comprises both receipt specifications 811-814; 821-823 and send specifications 816-819; 826-828. As in the illustration in FIG. 3, in FIG. 8 the receipt specifications are arranged on the left of the coin datasets 805 and the send specifications on the right of them.

Lastly, a distinction is made for functional specifications between direction specifications 821, 811, 816, 826, specifications for conditional transactions 822, 812, 817, 827, and specifications for transactions with return services 814, 819. The coin deposit or the coin management unit additionally also comprises amount specifications 813, 838, 828.

The issuer specifications 810 have been fixed in advance by the issuer at the time that the coin deposit or the coin management unit was created. The user specifications 820 are selected by the user but are selected to be narrower than the similar issuer specifications 810 (if these are present).

The issuer is the owner of a business. They restrict the coin deposit or coin management unit created by them for the user, therefore to their business ("the business") in the send specification 816. The send specification 816 in practice thus contains the ID(s) of the coin management unit(s) of the business and not a plain-text name as illustrated in the Figure. The user can thus send coin datasets of the coin deposit or coin management unit created by the issuer only to the specified business. The user cannot further restrict this specification and for this reason they are not given the option of selecting a send specification of the user 826. This is indicated in FIG. 8 by a box with a dotted border. In the receiving direction, the issuer has provided in its receipt specification 811 that coin datasets can be received by the business or by the user. The user can (optionally and therefore illustrated in dashed lines) select a stricter receipt specification of the user 821. In the example, the user has not selected a receipt specification but could, for example, have selected a restriction to "the business" or "none".

As can be seen in the issuer specifications with respect to the conditional transactions 812, 817, the issuer has not separately restricted the coin deposit or the coin management unit of the user in terms of conditional transactions. Its send and receipt specifications 811, 816 are, however, also valid for conditional transactions. The user has decided not to allow conditional receive transactions, as can be seen in the user specification 822 for the receiving direction of conditional transactions ("inactive"). Furthermore, the user would like to allow no random conditional send transactions and instead allow only the type of condition which is useful for them, the time condition which they want to use for the business. They have selected "time condition" in their user specification 827.

The issuer has additionally specified amount specifications 813, 818 for the coin deposit or the coin management unit. The coin deposit or the coin management unit can receive a maximum of 50 digital currency units in one transaction according to the issuer specification 813 and send a maximum of 200 digital currency units in one transaction according to the issuer specification 818.

The user is not given the option of further restricting the amount in the receiving direction (dotted box) for the user specification 823. In the sending direction, the user has selected 50 digital currency units as the maximum amount sent for their coin deposit in the specification 828.

Lastly, the issuer has excluded the existing option of executing transactions with return services with the coin deposit. The issuer specifications for transactions with return services 814, 819 are completely restricted ("inactive").

Issuer data 809 can contain, for example, an expiry time for the coin deposit (validity limit). Not illustrated but which can of course be present are others of the already mentioned data elements of a coin deposit such as, purely for example, the further data elements 237-239, 396*a-c*-398*a-c*, or 436-438 from FIGS. 3 and 4.

With these specifications, the user can then create, for example, two conditional transactions which have different write rights and read rights. A first conditional transaction is readable and writable only by the user. A coin dataset to the amount of 3 dW is to be sent from the coin deposit to the recipient "the business" with the condition "weekly every Sunday morning". The conditional transaction contains the transaction text for the subsequent transaction: "deliver 3 units". However, the conditional transaction does not yet contain a coin dataset. This conditional transaction cannot be read by the coin management unit of the business. A second conditional transaction is provided for a certain point in time and already contains a high-value coin dataset to be sent to the business, for example to the amount of 100 dW. The second conditional transaction is a guaranteed conditional transaction. The user and the business have read rights for the conditional transaction but write rights have not been allocated such that the execution of the associated transaction at the time mentioned is guaranteed. Depending on the details of the implementation of the transaction, the coin dataset can in any case not be used yet without an additional piece of information, or a secret data element of the coin dataset is secured, for example is decrypted only when the transaction is executed. The coin management unit of the business can read the conditional transaction and consequently knows that and when it will receive the coin dataset. It can then, for example, order a high-value product for the user.

Conditional transactions which are provided selectively with write and/or read rights represent, with or without specifications, a very flexible means of enabling a surprisingly wide range of transaction types.

Different conditional transactions and their data elements will be described in more detail again on the basis of FIG. 9.

FIG. 9 shows different conditional transactions, which can be distinguished on the basis of the transaction number 931, as entries in rows of a list. The basic data 91 of the conditional transaction comprise the sender 911, the recipient 912, and the amount 931. The condition 92 of the conditional transaction comprises a checking criterion 921, an execution limit 922, and optionally the type 923 of the conditional transaction. The execution limit 922 can comprise a number of executions and/or a time indication (such as "only once" and/or "only until 09.00 on 03.03.2021"). The various read and/or write rights 96 are shown in abbreviated form in column 96. The extension data 93 comprise data elements which are optional and/or are generated possibly only when the transaction is executed. The transaction numbers T-1 to T-2 are the actual transaction numbers of the subsequently executed transaction, as references 931. In contrast, the transaction numbers R-1 to R-4 are temporary references for the conditional transactions. Coin datasets 932 contain only the first two conditional transactions. A transaction reference text 933 can be provided.

The ID of the coin management unit of the user is ID1. The first conditional transaction with the already generated transaction number T-1 is a guaranteed conditional transaction. The already prepared coin dataset CI with the amount 913 '100' is sent by the sender 911 with IDI to the recipient 921 with ID2 in a transaction as soon as the checking criterion 921 'date' has been satisfied (i.e. on a certain day). The number of executions 922 is one (one-time execution) and the type A which is intended to represent a guaranteed conditional transaction in the example. Accordingly, according to the write and/or read rights 'I', the user has no write rights but both transaction partners 911, 912 have read rights. The transaction reference text 933 contains the information 'A789' which allows association with the transaction partners, for example with respect to an invoice.

For guaranteed conditional transactions, the user has no write rights but the read and/or write rights of third parties can differ. For example, the fourth conditional transaction with the reference number R2 is a further guaranteed conditional transaction (type A). If, as condition 921, the total amount of the coin datasets in the coin management unit of the user exceeds a 'threshold', a coin dataset with the amount 931 of '10' is sent from the coin management unit of the user to the recipient 912, the coin management unit with the ID4. The fourth conditional transaction is executed unlimitedly often as no execution limit 922 is contained. According to the write and/or read rights 96 'III', the user has no write rights but the coin management unit with the ID4 does (in contrast, they both have read rights). Different conditional transactions of one type of conditional transaction can have the same write and/or read rights 96 but their write and/or read rights 96 can also differ, as has just been shown.

The second conditional transaction with the reference number R-2 also already contains a coin dataset 932, 'C2'. The condition is, however, an external event, for example the receipt of a secret security value such as a signature or password for the conditional transaction. If the coin management unit of the user receives the security value, the coin dataset is sent to the recipient 912 'ID3' in a send transaction. The second conditional transaction can be referred to as a callable conditional transaction. 'B' is accordingly entered as the type 923. In this example, according to the number of executions 922 it can be called only once. The read and/or write rights 96 'II' indicate that only the two transaction partners have the read rights and the user has write rights.

A callable conditional transaction (type B) is also shown in the fifth row. Callable conditional transactions contain a reference, i.e. in particular a transaction number or (temporary) reference number, in order to be uniquely callable. According to column 922, the conditional transaction with the reference number R-3 can be called three times, according to column 912 can be called by all the coin management units of the group G1, and can be called at the request of one coin management unit of the group G1 to the current coin management unit with ID1, i.e. without knowing the security value. The second and the fifth conditional transaction have the same write and/or read rights 96. In a variant not illustrated separately, a callable conditional transaction can be called for a certain recipient-once, many times, or unlimitedly—by a transaction request. Write and/or read rights 96 'II' are appropriate for this variant too.

The third conditional transaction with the reference 931 'R-1' is a periodic conditional transaction (type 923 'C'). It is executed periodically with the period 'time', i.e. for example daily, weekly, or every 2 hours, which is indicated in the checking criterion condition 921. In this conditional transaction, the recipient 912 is the coin management unit of the user. It thus periodically receives a coin dataset (or multiple coin datasets) with the indicated amount 913 from the coin management unit ID4 as the sender 911. The third and the fourth conditional transaction have the same write and/or read rights 96, and the coin management unit ID4 can write these conditional transactions. It should be noted that the two conditional transactions are coordinated, the third conditional transaction periodically demands the sending of coin datasets from ID4 to ID1, and the fourth conditional transaction sends coin datasets back again when the indicated threshold is exceeded, and as long as this condition has been satisfied.

The conditional transaction of one type, such as for example a periodic conditional transaction, can be receipt or send transactions. The fourth conditional transaction could thus also be configured as a send transaction.

The sixth transaction with the (optional) reference number R-4 is a conditional return service transaction (type 923 'D'). The condition 921 is the input of a receive transaction (recipient 912 'ID1') with the amount 912 '40' as an event. The sender 911 must belong to the group G2. The return service GL can be described in the transaction reference text 933. For example, the sender receives an entrance ticket for an event, for example as a QR code sent to their email address which is indicated in the transaction reference text of the receive transaction. Because in the example the event takes place on a Tuesday, the sixth conditional transaction comprises an execution time limit 922 and is limited until 'Mon' (Monday). The write and/or read rights 96 can be selected in different fashions; in the example with 'IV', only the user is to have read and write rights. The senders would need to be informed about the existence of the conditional transaction by a different channel, for example via email/SMS/Broadcast, etc. If, in contrast, write and read rights 96 are selected which also enable reading for the coin management units of the group G2, the separate information can be omitted.

Further options for conditional transactions will be described without reference to FIG. 9 for a coin management unit which offers a return service. The return service could be provided in digital form and in many use cases the return service is performed locally and can also be offline (with no network connection). The return service can be, for example, access to an area (such as a stadium, zoo, or museum), the supplying of power, or operation of a machine (such as a washing machine or carwash). The coin management unit of the user which performs the return service is preferably a local coin management unit with an independent execution unit which is arranged at the location of the return service, in particular it is a security module which can be used reversibly or is permanently installed.

The coin management unit of the user (the performer of the return service) can comprise different conditional return service transactions with write and/or read rights which are different from one another (and are optionally the same).

A conditional return service transaction can be a guaranteed conditional transaction (which the user can thus not modify). The guaranteed conditional return service transaction is, for example, written when the coin management unit is produced and is no longer writable but is readable by anyone. In the case of a receive transaction with the amount X, the sender always receives a return service of the type Y and/or the duration Z, for example power for or operation of the washing machine in each case for 30 minutes.

A further conditional return service transaction can be called temporarily. It contains an execution time limit. This conditional transaction is readable for everyone and writable by the user. In the example, the same return service is offered in a time period (such as 'today') for a lower amount (such as amount: 'X−10%').

Another conditional return service transaction with a reduced amount (such as amount: X−5%) or an improved return service (duration: Z*1.2) can presuppose the receipt of a codeword indicated in the condition or the transaction reference text. This conditional return service transaction is not readable for third parties (and is writable and readable for the user). The third party learns about the codeword not by reading the conditional transaction. They could obtain the codeword, for example, from a newspaper, an app, the internet, or other channels. The third party then sends the codeword, in particular together with the coin dataset (for example, in the transaction reference text), to the coin management unit of the user. The condition of the conditional transaction is satisfied and the return service is provided.

A further conditional return service transaction can be readable only for a certain group. The return service is readable only for members of this group, such as regular customers or company members, for the reduced amount or with the improved return service (such as a longer duration or higher intensity of the return service, for example the current strength at a charging station) and is thus callable, for example, via the reference number or with a codeword read at the same time.

The coin management unit can comprise a periodic conditional transaction which sends the coin dataset (in particular all the coin datasets) received, for example once a day, to a collection coin management unit of the user. Multiple coin management units of the user can be configured to send periodically to the collection coin management unit. If the coin management unit does not have its own internet connection, the received coin datasets are registered in the coin register and/or transmitted to the collection coin management unit of the user only at a later point in time.

The encoding of the specifications 811-828 in FIG. 8 and the data elements of the conditional transaction in FIG. 9 is illustrated in the Figures partially as text for better readability but can have any length and encoding (one or more bits, one or more bytes, byte sequences, etc or encoded numerically, hexadecimally, in binary, as a string, etc). Encoding of the data elements of the coin deposit or the conditional transaction as a TLV structure (tag, length, value) is also conceivable, such as encoding of the transactions, the conditional transactions, or the coin deposit in a JSON format.

Within the scope of the invention, all the described and/or drawn and/or claimed elements can be combined with one another in any desired fashion.

The invention claimed is:

1. A coin management unit of a user, comprising:

an execution unit for managing digital coin datasets of a digital central bank currency system, wherein the execution unit is adapted to exchange digital coin datasets with other coin management units in transactions and to send registration demands to a coin register of the central bank; and at least one digital coin dataset;

wherein the coin management unit is adapted to store conditional transactions as data elements, wherein a transaction is executed only when a condition of the stored conditional transaction is satisfied; and the coin management unit is adapted to store the conditional transactions with different read and/or write rights;

wherein a first conditional transaction has first read and/or write rights and a second conditional transaction has second different read and/or write rights which differ in the read rights, the write rights, or the read and write rights;

wherein the coin management unit is further adapted to:

receive a read and/or write request from a requester, a user of the coin management unit or another coin management unit, for at least one conditional transaction;

check an authentication of the requester;

check the read and/or write rights of the at least one conditional transaction; and answer the read and/or write request depending on the read and/or write rights, in the case of a read request by providing the conditional transaction for the requester or in the case of a write request by writing the conditional transaction.

2. The coin management unit according to claim 1, wherein the read and/or write rights differ in the write rights for the user and/or in the read and/or write rights for third parties.

3. The coin management unit according to claim 1, wherein the conditional transaction comprises:

a time condition, in a point in time or a time period, a comparative condition, comprise a comparative value for an internal or external parameter, a receipt condition, including a receipt of a security value or a code value of the conditional transaction, receipt of a receive transaction, or receipt of a request for the conditional transaction.

4. The coin management unit according to claim 1, wherein the coin management unit, its execution unit or a condition checking unit, checks whether the condition of the conditional transaction has been satisfied, wherein the check is made continuously, periodically, and/or in response to a receipt procedure.

5. The coin management unit according to claim 1, wherein at least two different types of conditional transactions are stored, from the following types: guaranteed conditional transaction, callable conditional transaction, or conditional return service transaction;

wherein stored in the coin management unit are:

at least two conditional transactions of a first type which have the same or different read and/or write rights, and/or at least two conditional transactions of the at least two different types which have the same or different read and/or write rights.

6. The coin management unit according to claim 1, wherein the conditional transaction is configured to await one or more of the data elements of the transaction to be executed only when the condition is satisfied prior to execution, including one or more of the following data elements:

an identifier of the sender of the at least one coin dataset an identifier of the recipient of the at least one coin dataset, a transaction number, the at least one coin dataset of the transaction to be executed.

7. The coin management unit according to claim 1, wherein the coin management unit is a coin management unit with an independent execution unit, or a coin management unit is in a coin deposit management unit with multiple coin deposits, of different users, which comprises one of the coin deposits and has a common execution unit for the multiple coin deposits.

8. The coin management unit according to claim 1, wherein each coin management unit comprises an identifier of the coin management unit and optionally comprises a key and/or a certificate associated with the identifier and/or the key.

9. The coin management unit according to claim 1, wherein the coin management unit comprises a storage area for conditional transactions of the coin management unit, and one or more of the following pieces of information are stored a common storage area for multiple coin deposits of the coin management unit or a coin deposit management unit with the coin management unit:

references to one or more coin deposits with conditional transactions, including coin deposits to be checked at certain times, with their checking interval; and/or the conditions to be checked of conditional transactions of multiple coin deposits; and/or the conditional transactions of the coin management unit which are readable for each third party.

10. The coin management unit according to claim 1, wherein conditional transactions, on the basis of the read and/or write rights:

are readable by at least one other coin management unit of another user of the digital central bank currency system but are writable only by the user or only jointly by the user and the at least one other coin management unit of the other user of the digital central bank currency system; and/or are readable and writable only by the user; and/or are readable by at least one other coin management unit of another user of the digital central bank currency system but are writable only by an issuer unit.

11. The coin management unit according to claim 1, wherein the coin management unit is configured to check one or more of the following specifications before the execution of transactions:

a recipient specification which restricts the coin management unit to precisely one recipient, precisely one recipient group or to multiple recipients and/or recipient groups, and/or;

a sender specification which restricts the coin management unit to precisely one sender, precisely one sender group or multiple senders and/or sender groups, and/or a functional specification which relates to a function which can be executed by the execution unit and which restricts the executable function for the coin management unit, for a coin deposit of the coin management unit, completely, partially, or not at all; and/or a send or receive specification which restricts the sending of coin datasets, or respectively the receipt of coin datasets for the coin management unit, for a coin deposit of the coin management unit; and/or an amount specification with a maximum value for the amount of the coin dataset to be sent and/or for the amount of the coin dataset to be received and/or a maximum value or a minimum value for the total amount of the stored coin datasets;

a specification which can be selected by the user, which is to be selected by the user such that it is narrower than a specification fixed by the issuer of the coin management unit; and/or a return service specification, wherein, in response to at least one received coin dataset as a service, the return service is provided, in the response data to the sender of the received coin dataset.

12. The coin management unit according to claim 11, wherein the coin management unit comprises specifications and is configured to check the specifications before the storage of a conditional transaction, wherein the specifications comprise a specification for conditional transactions and/or one or more of the specifications.

13. The coin management unit according to claim 1, wherein the coin management unit has a first coin deposit and at least one second coin deposit;

wherein the first and the second coin deposit are associated with the user; or wherein the first coin deposit is associated with the user and the second coin deposit is associated with another user of the digital central bank currency system in a coin deposit management unit.

14. The coin management unit according to claim 1, wherein the secure execution unit for managing the coin datasets sends transaction register data to a transaction register, wherein the transaction register data comprise a unique transaction identifier, a transaction amount, a coin management unit identifier of the sender, a coin management unit identifier of the recipient, and the register reference of the coin dataset in the coin register; and/or sends registration demands to the coin register which comprise at least one register reference of a coin dataset previously registered in the coin register and a register reference of a coin dataset to be registered in the coin register.

15. A method for managing coin datasets of a digital central bank currency system with a coin register in a coin management unit, which comprises an execution unit and at least one coin dataset of the central bank, with the steps:

storing a first conditional transaction which contains a condition for the execution of a transaction, wherein the transaction comprises the exchange of at least one coin dataset between the coin management unit and another coin management unit of the digital central bank currency system, wherein the first conditional transaction is stored in the coin management unit as a data element, and wherein the first conditional transaction has read and/or write rights which differ from read and/or write rights of an already stored second conditional transaction;

checking whether the condition has been satisfied; executing the transaction only if the condition has been satisfied;

receiving a read and/or write request from a requester, a user of the coin management unit or another coin management unit, for at least one conditional transaction;

checking an authentication of the requester;

checking the read and/or write rights of the at least one conditional transaction; and answering the read and/or write request depending on the read and/or write rights, in the case of a read request by providing the conditional transaction for the requester or in the case of a write request by writing the conditional transaction.

16. The method according to claim 15, wherein the coin management comprises:

an execution unit for managing digital coin datasets of a digital central bank currency system, wherein the execution unit is adapted to exchange digital coin datasets with other coin management units in transactions and to send registration demands to a coin register of the central bank; and at least one digital coin dataset;

wherein the coin management unit is adapted to store conditional transactions as data elements, wherein a transaction is executed only when a condition of the stored conditional transaction is satisfied; and the coin management unit is adapted to store the conditional transactions with different read and/or write rights.

17. The method according to claim 15, wherein executing the transaction comprises:

sending the coin dataset to the other coin management unit or receiving the coin dataset from the other coin management unit; and/or sending a registration demand to a coin register of the central bank, said registration demand comprising at least one register reference of a coin dataset previously registered in the coin register and a register reference of a coin dataset to be registered in the coin register, and/or sending transaction register data to a transaction register, and/or providing a return service after receiving the coin dataset as the condition.

18. The method according to claim 15, wherein one or more of the following steps are performed before the storage step:

checking an authentication of the user;

checking a specification for the transaction to be executed and/or the conditional transaction.

19. A digital central bank currency system, comprising:

a plurality of coin management units wherein each coin management unit comprises coin management unit of a user, comprising:

an execution unit for managing digital coin datasets of a digital central bank currency system, wherein the execution unit is adapted to exchange digital coin datasets with other coin management units in transactions and to send registration demands to a coin register of the central bank; and at least one digital coin dataset;

wherein the coin management unit is adapted to store conditional transactions as data elements, wherein a transaction is executed only when a condition of the stored conditional transaction is satisfied; and the coin management unit is adapted to store the conditional transactions with different read and/or write rights, or is configured to perform a method according to claim 15, the system further comprising the coin register of the central bank, and optionally a plurality of coin deposit management units and/or a transaction register.

20. A coin management unit of a user, comprising:

an execution unit for managing digital coin datasets of a digital central bank currency system, wherein the execution unit is adapted to exchange digital coin datasets with other coin management units in transactions and to send registration demands to a coin register of the central bank; and at least one digital coin dataset;

wherein the coin management unit is adapted to store conditional transactions as data elements, wherein a transaction is executed only when a condition of the stored conditional transaction is satisfied; and the coin management unit is adapted to store the conditional transactions with different read and/or write rights;

wherein a first conditional transaction has first read and/or write rights and a second conditional transaction has second different read and/or write rights which differ in the read rights, the write rights, or the read and write rights;

wherein the coin management unit is configured to check one or more of the following specifications before the execution of transactions:

a recipient specification which restricts the coin management unit to precisely one recipient, precisely one recipient group or to multiple recipients and/or recipient groups, and/or;

a sender specification which restricts the coin management unit to precisely one sender, precisely one sender group or multiple senders and/or sender groups, and/or a functional specification which relates to a function which can be executed by the execution unit and which restricts the executable function for the coin management unit, for a coin deposit of the coin management unit, completely, partially, or not at all; and/or a send or receive specification which restricts the sending of coin datasets, or respectively the receipt of coin datasets for the coin management unit, for a coin deposit of the coin management unit; and/or an amount specification with a maximum value for the amount of the coin dataset to be sent and/or for the amount of the coin dataset to be received and/or a maximum value or a minimum value for the total amount of the stored coin datasets;

a specification which can be selected by the user, which is to be selected by the user such that it is narrower than a specification fixed by the issuer of the coin management unit; and/or a return service specification, wherein, in response to at least one received coin dataset as a service, the return service is provided, in the response data to the sender of the received coin dataset.

* * * * *